United States Patent [19]
Egami et al.

[11] Patent Number: 5,789,881
[45] Date of Patent: Aug. 4, 1998

[54] POWER SOURCE CONTROL APPARATUS FOR HYBRID VEHICLES

[75] Inventors: Tsuneyuki Egami, Gamagoori; Yousuke Setaka, Anjo; Tatsuru Morioka, Okazaki; Keiichiro Banzai, Toyota, all of Japan

[73] Assignee: Denso Corporation, Kariya, Japan

[21] Appl. No.: 777,186

[22] Filed: Dec. 27, 1996

[30] Foreign Application Priority Data

Dec. 27, 1995 [JP] Japan .................................. 7-341457

[51] Int. Cl.[6] .................................................. B60L 11/04
[52] U.S. Cl. .......................... 318/139; 318/146; 318/151; 180/65.4; 290/14
[58] Field of Search .................................. 318/139, 140, 318/148, 151; 180/65.1, 65.3, 65.4; 290/8–9, 11, 14, 16, 18, 19, 47, 50

[56] References Cited

U.S. PATENT DOCUMENTS

| | | |
|---|---|---|
| 3,791,473 | 2/1974 | Rosen . |
| 4,305,254 | 12/1981 | Kawakatsu et al. . |
| 4,335,429 | 6/1982 | Kawakatsu . |
| 4,407,132 | 10/1983 | Kawakatsu et al. . |
| 5,033,425 | 7/1991 | Kadomukai et al. . |
| 5,327,992 | 7/1994 | Boll . |
| 5,343,970 | 9/1994 | Severinsky . |
| 5,428,274 | 6/1995 | Furutani et al. . |
| 5,463,294 | 10/1995 | Valdivia et al. . |
| 5,545,928 | 8/1996 | Kotani . |
| 5,589,743 | 12/1996 | King .................................. 318/139 |

FOREIGN PATENT DOCUMENTS

| | | |
|---|---|---|
| 0 645 278 | 3/1995 | European Pat. Off. . |
| 41 33 014 | 4/1993 | Germany . |
| 43 24 010 | 1/1995 | Germany . |
| 55-127221 | 10/1980 | Japan . |
| 56-132102 | 10/1981 | Japan . |
| 59-037241 | 2/1984 | Japan . |
| 60-84903 | 5/1985 | Japan . |
| 63-212723 | 9/1988 | Japan . |
| 5-146008 | 6/1993 | Japan . |
| 5-046761 | 7/1993 | Japan . |
| 5-302526 | 11/1993 | Japan . |
| 6-048222 | 2/1994 | Japan . |
| 6-245320 | 9/1994 | Japan . |
| 6-247186 | 9/1994 | Japan . |

OTHER PUBLICATIONS

A. Vezzini, et al., "Performance Optimization for the Electrical Drive System of the Hybrid III–Passenger Car", International Electric Vehicle Symposium Anaheim, Dec. 5, 1994, vol. 2, No. SYMP 12, pp. 678–687.

O. Vittone, et al., "Fiat Conceptual Approach to Hybrid Cars Design", International Electric Vehicle Symposium Anaheim, Dec. 5, 1994, vol. 2, No. SYMP 12, pp. 458–469.

*Primary Examiner*—Bentsu Ro
*Attorney, Agent, or Firm*—Cushman Darby & Cushman IP Group of Pillsbury Madison & Sutro LLP

[57] ABSTRACT

A power source control apparatus for parallel and series hybrid vehicles is provided. The power source control apparatus determines a required torque of a power source consisting of a generator-motor and an internal combustion engine based on a parameter indicating an operational mode of the vehicle and interrupts fuel supply to the internal combustion engine in a cycle based on the required torque of the power source so as to minimize a fuel consumption. The power source control apparatus further determines a required torque of the generator-motor based on the required torque of the power source and an output torque of the internal combustion engine to switch an operation mode of the generator-motor between a generator mode and a motor mode so as to compensate for a variation in output of the internal combustion engine during the cyclic fuel cut control.

18 Claims, 28 Drawing Sheets

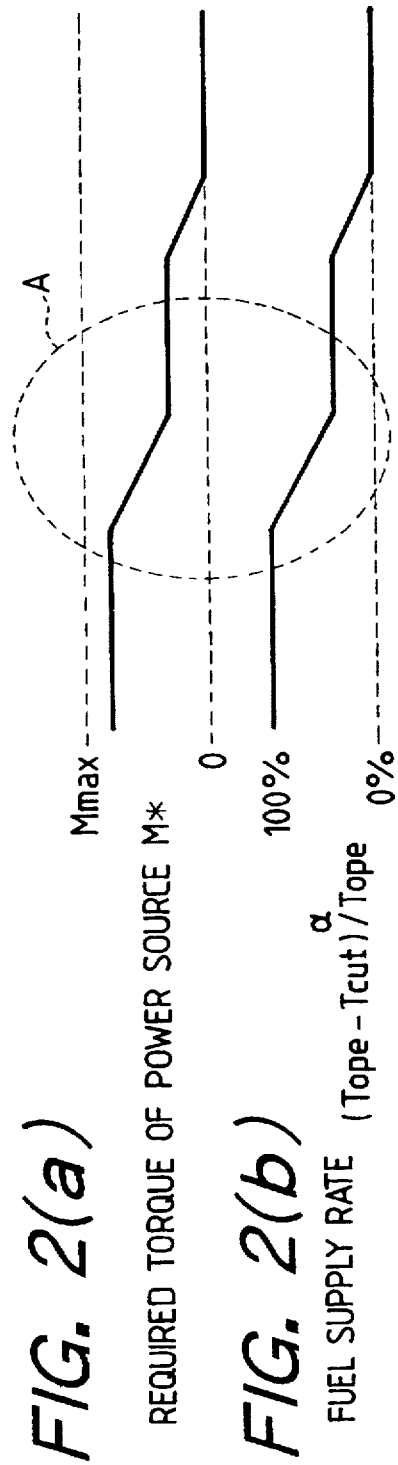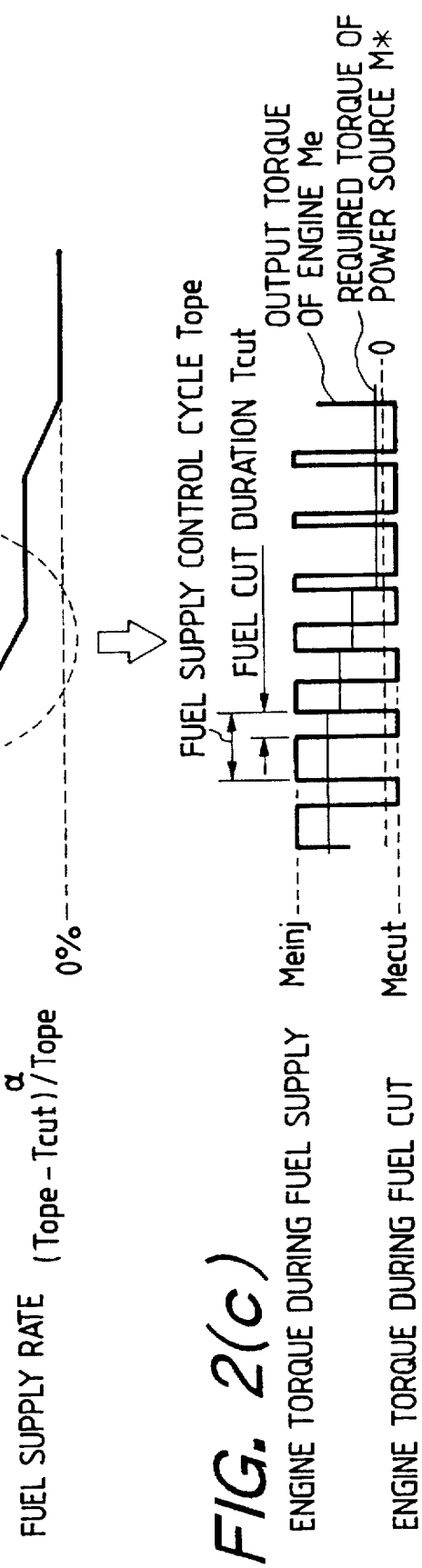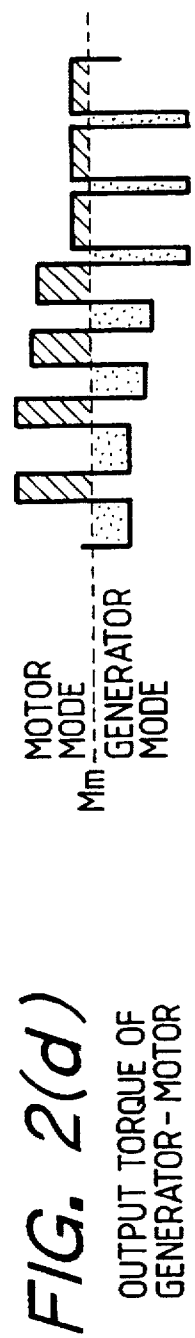
FIG. 2(a) REQUIRED TORQUE OF POWER SOURCE M*
FIG. 2(b) FUEL SUPPLY RATE $\alpha$ (Tope−Tcut)/Tope
FIG. 2(c) ENGINE TORQUE DURING FUEL SUPPLY Meinj
ENGINE TORQUE DURING FUEL CUT Mecut
FIG. 2(d) OUTPUT TORQUE OF GENERATOR-MOTOR Mm

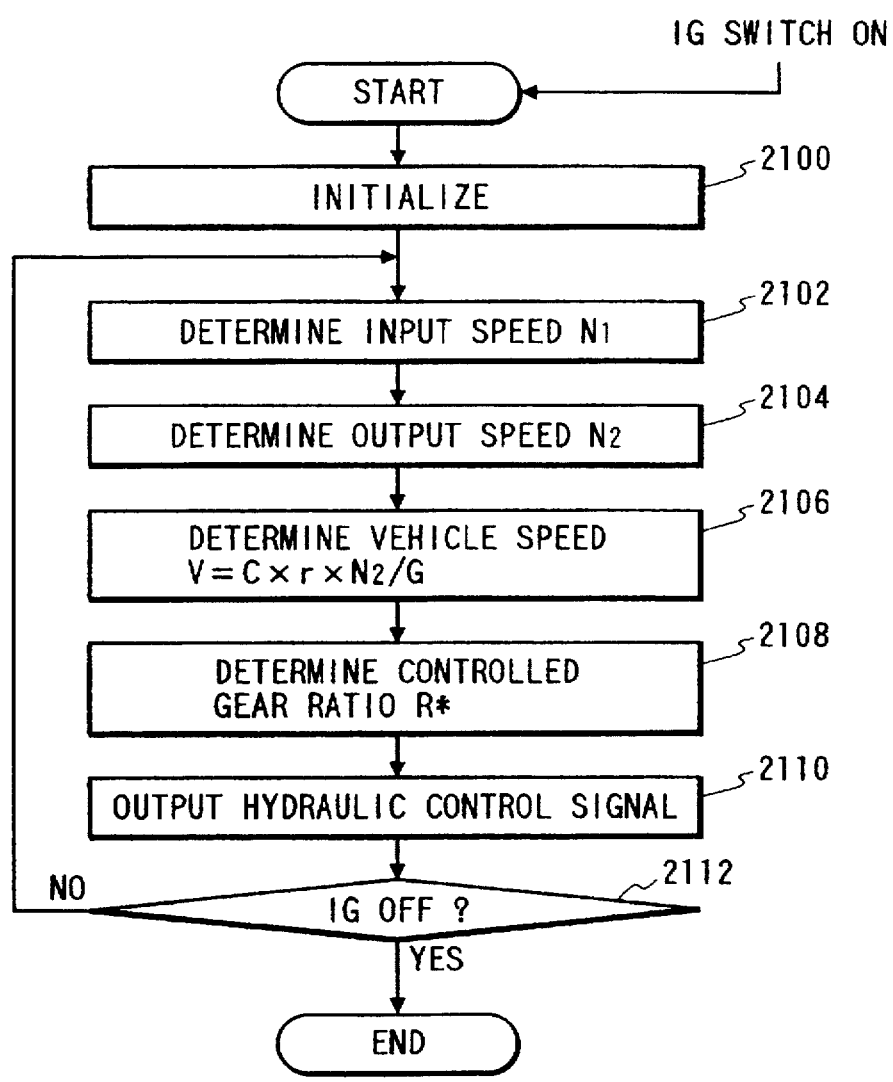

POWER SOURCE CONTROL APPARATUS FOR HYBRID VEHICLES

BACKGROUND OF THE INVENTION

1. Technical Field

The present invention relates generally to a hybrid vehicle having a power source consisting of an internal combustion engine and an electric motor, and more particularly to a power source control apparatus for hybrid vehicles designed to variably control the output torque of an internal combustion engine with a minimum fuel consumption over a wide range of vehicle traveling modes.

2. Background of Related Art

In recent years, there have been proposed hybrid vehicles which activate either or both an internal combustion engine and an electric generator-motor as a power source of the vehicle. In general, the hybrid vehicles are classified into two types: one of which is a parallel hybrid vehicle having mounted therein an internal combustion engine and an electric generator-motor both operating as a power source, and the second being a series hybrid which drives an electric generator-motor using an internal combustion engine to charge a storage battery and supplies either the electrical energy of the storage battery or power produced by the generator-motor directly to a vehicle-drive electric motor.

U.S. Pat. No. 5,428,274 filed on Nov. 17, 1992 teaches the series hybrid vehicle which selectively provides one of the power output from a generator driven by an internal combustion engine and the electrical energy of a storage battery to a vehicle-drive electric motor according to an output of the vehicle-drive electric motor. The vehicle-drive electric motor is activated by the output of the generator driven by the internal combustion engine within a range of 60% to 100% of a maximum output $P_{emax}$ of the internal combustion engine since the internal combustion engine can usually run with an economical fuel consumption within that range. Within a range below 60% of the maximum output $P_{emax}$, the internal combustion engine is usually difficult to run with an economical fuel consumption. The vehicle-drive electric motor is thus activated only by the output from the storage battery. The internal combustion engine is always driven at WOT (wide open throttle), and the output thereof is adjusted by changing the quantity of fuel to be injected.

Japanese Patent Second Publication No. 5-46761 teaches a vehicle traveling control system for the second type of parallel hybrid vehicle. This control system has a one-way clutch disposed between an internal combustion engine and an electric motor to drive the vehicle selectively with one of the internal combustion engine and the electric motor. The vehicle is driven only by the internal combustion engine within an economical fuel consumption range, while it is driven only by the electric motor within an uneconomical fuel consumption range where the internal combustion engine runs at low speeds and outputs a lower torque. Specifically, the internal combustion engine is operated, like the series hybrid vehicles, only within a limited range of power required for driving the vehicle. Within another range of power, the vehicle is powered only by the electric motor.

The series hybrid vehicle, as taught in U.S. Pat. No. 5,428,274, works the internal combustion engine within an economical fuel consumption range, while it deactivates the internal combustion engine within an uneconomical fuel consumption range. Specifically, only the electrical energy of the storage battery is used to drive the vehicle within the engine inoperative range. Thus, a large capacity of the storage battery is required, resulting in an increase in weight of the vehicle. Additionally, since the output power of the internal combustion engine is adjusted by modifying an air-fuel ratio, an operational range allowing the internal combustion engine to run at a lower emission level is limited, thereby decreasing a power output range of the internal combustion engine.

The latter parallel hybrid vehicle, as taught in Japanese Patent Second Publication No. 5-46761, works the internal combustion engine within the economical fuel consumption range, while it works only the electric motor within the uneconomical fuel consumption range and thus inevitably encounters the disadvantage that the total weight of the vehicle is increased by the storage battery. It is known in the art that in internal combustion engines of the type wherein fuel is injected into an intake pipe, the fuel stays within the intake pipe. Therefore, when the supply of fuel is stopped, it will cause the fuel staying within the intake pipe to be sucked into a combustion chamber, resulting in a lean mixture. This causes a misfire to occur so that unburned gas is discharged, resulting in deterioration of emission control. The resumption of the fuel supply requires increase in quantity of fuel to be injected into the engine for compensating for the amount of fuel which will stay within the intake pipe in order to establish the stoichiometric air-fuel ratio. The determination of the amount of fuel to stay within the intake pipe is usually difficult due to deposits in the intake pipe. Specifically, internal combustion engines of the type wherein the fuel is injected to an intake pipe inevitably encounter the drawback in that repeated interruption of fuel supply to the engine causes the emission control to be deteriorated.

Therefore, in order to achieve fuel economy of an internal combustion engine in a hybrid vehicle having substantially the same performance as those of conventional automotive vehicles, it is necessary to minimize consumption of electrical energy stored in a storage battery for avoiding increase in total weight of the vehicle. To this end, a system capable of selectively change power output of an internal combustion engine according to traveling conditions of the vehicle while driving the internal combustion engine at selected speeds with a selected quantity of intake air required for minimizing the fuel consumption is sought.

SUMMARY OF THE INVENTION

It is therefore a principal object of the present invention to avoid the disadvantages of the prior art.

It is another object of the present invention to provide a power source control apparatus for a hybrid vehicle capable of changing the output of an internal combustion engine with an economical fuel consumption over a wide range of vehicle traveling modes.

According to one aspect of the present invention, there is provided a power source control apparatus for a hybrid vehicle driven by a power source including an internal combustion engine and a generator-motor which comprises: (a) a generator-motor driver actuating the generator-motor; (b) a battery unit supplying electric energy to the generator-motor through the generator-motor driver; (c) a required power source torque determining circuit determining a required torque of the power source based on a parameter indicating an operational mode of the vehicle; (d) a fuel supply controller interrupting fuel supply to the internal combustion engine in a cycle based on the required torque of the power source determined by the required power source torque determining circuit; (e) an engine output torque determining circuit determining an output torque of the internal combustion engine; and (f) a required generator-motor torque determining circuit determining a required torque of the generator-motor based on the required torque of the power source determined by the required power source torque determining circuit and the output torque of the internal combustion engine determined by the engine output torque determining circuit, the required generator-motor torque determining circuit providing a signal indicative of the required torque of the generator-motor to the generator-motor driver to actuate the generator-motor so as to output the required torque of the generator-motor.

In the preferred mode of the invention, the fuel supply controller determines a fuel cut duration in which the internal combustion engine undergoes a fuel cut every given number of revolutions of the internal combustion engine and synchronizes the fuel cut duration with given timing associated with fuel injection timing.

A vehicle speed sensor is further provided which measures a speed of the vehicle. The fuel supply controller prohibits the fuel supply to the internal combustion engine all the time when the speed of the vehicle is less than a given value.

The fuel cut duration is determined at least based on the required torque of the power source and an operational efficiency of the generator-motor driver.

The fuel cut duration may alternatively be determined at least based on the required torque of the power source and the state of charge of the battery unit.

A voltage detecting circuit is further provided which detects a terminal voltage of the battery unit and a current detecting circuit detecting a current flowing into and out of the battery unit. The state of charge of the battery unit is determined based on any one of a remaining capacity of the battery unit determined by the terminal voltage and the current detected by the voltage detecting circuit and the current detecting circuit, the terminal voltage of the battery unit, and an internal impedance of the battery unit determined by the terminal voltage and the current detected by the voltage detecting circuit and the current detecting circuit.

The fuel supply controller synchronizes the fuel cut duration with given fuel injection timing.

The required generator-motor torque determining circuit controls through the generator-motor driver the generator-motor so that a variation in the required torque of the generator-motor is synchronous with a combustion cycle of the internal combustion engine.

The required generator-motor torque determining circuit controls through the generator-motor driver the generator-motor so that the generator-motor outputs torque in the fuel cut duration.

The required generator-motor torque determining circuit controls through the generator-motor driver the generator-motor so that a time where the required torque of the generator-motor is changed is synchronous with any one of ignition timing of the internal combustion engine, a time when a pressure in a cylinder of the internal combustion engine reaches a given level, and a time when flames in the cylinder of the internal combustion engine are detected.

An intake air regulator is further provided which regulates the amount of intake air of the internal combustion engine. The intake air regulator maintains the amount of intake air per revolution of the internal combustion engine constant in the fuel cut duration in which the internal combustion engine undergoes a fuel cut, while it increases the amount of intake air per revolution of the internal combustion engine in the fuel supply duration in which fuel is supplied to the internal combustion engine.

A fuel injection mechanism is further provided which injects fuel directly into a cylinder of the internal combustion engine.

According to another aspect of the invention, there is provided a hybrid vehicle having an accelerator pedal and a brake pedal which comprises: (a) a power source including an internal combustion engine and a generator-motor, providing an output torque: (b) an accelerator sensor monitoring an operation of the accelerator pedal to determine an accelerator-manipulated variable; (c) a brake sensor monitoring an operation of the brake pedal to determine a brake-manipulated variable; (d) a power source speed detector determining a speed of the power source; (e) a continuously variable transmission including a torque input element into which the output torque of the power source is inputted and a torque output element outputting torque to wheels of the vehicle; (f) a transmission speed sensor determining a speed of the torque output element of the continuously variable transmission; (g) a transmission controller controlling a gear ratio of the continuously variable transmission based on the speed of the torque output element determined by the transmission speed sensor and the speed of the power source determined by the power source speed detector; (h) a generator-motor driver actuating the generator-motor; (i) a battery unit supplying electric energy to the generator-motor through the generator-motor driver; (j) a required power source torque determining circuit determining a required torque of the power source based on the accelerator-manipulated variable and the brake-manipulated variable; (k) a fuel supply controller prohibiting fuel supply to the internal combustion engine in a cycle based on the required torque of the power source determined by the required power source torque determining circuit; (l) an engine output torque determining circuit determining an output torque of the internal combustion engine; and (m) a required generator-motor torque determining circuit determining a required torque of the generator-motor based on the required torque of the power source determined by the required power source torque determining circuit and the output torque of the internal combustion engine determined by the engine output torque determining circuit, the required generator-motor torque determining circuit providing a signal indicative of the required torque of the generator-motor to the generator-motor driver to actuate the generator-motor so as to output the required torque of the generator-motor.

According to a further aspect of the invention, there is provided a hybrid vehicle having an accelerator pedal and a brake pedal which comprises: (a) a vehicle drive electric motor providing an output torque to wheels of the vehicle; (b) an inverter actuating the vehicle drive electric motor; (c) a battery unit supplying electric energy to the vehicle drive electric motor through the inverter; (d) a power source including a generator-motor and an internal combustion engine, the internal combustion engine driving the generator-motor in a generator mode so as to produce electrical energy for charging the battery unit and driving the vehicle drive electric motor; (e) a motor speed sensor measuring a speed of the vehicle drive electric motor; (f) an accelerator sensor monitoring an operation of the accelerator pedal to determine an accelerator-manipulated variable; (g) a brake sensor monitoring an operation of the brake pedal to determine a brake-manipulated variable; (h) a generator-motor driver actuating the generator-motor in a motor mode; (i) a vehicle driver electric motor controller determining a required torque of the vehicle drive electric motor at least based on the accelerator-manipulated variable, the brake-manipulated variable, and the speed of the vehicle drive electric motor to determine a required power of the vehicle based on the required torque of the vehicle drive electric motor and the speed of the vehicle drive electric motor, the vehicle drive electric motor controller controlling the vehicle drive electric motor based on the required power of the vehicle through the inverter; (j) a power source speed determining means for determining a speed of the power source; (k) a required torque determining circuit determining a required torque of the power source based on the required power of the vehicle determined by the vehicle drive motor controller and the speed of the power source determined by the power source speed determining means; (l) a fuel supply controller prohibiting fuel supply to the internal combustion engine in a cycle based on the required torque of the power source determined by the required power source torque determining circuit; (m) an engine output torque determining circuit determining an output torque of the internal combustion engine; and (n) a required generator-motor torque determining circuit determining a required torque of the generator-motor based on the required torque of the power source determined by the required power source torque determining circuit and the output torque of the internal combustion engine determined by the engine output torque determining circuit, the required generator-motor torque determining circuit providing a signal indicative of the required torque of the generator-motor to the generator-motor driver to actuate the generator-motor so as to output the required torque of the generator-motor.

In the preferred mode of the invention, a power source deactivating means is further provided for deactivating the power source when an absolute value of the required power of the vehicle is less than a given value.

A power source starting means is further provided for starting the power source when the absolute value of the required power of the vehicle exceeds the given value.

The power source activating means controls a starting operation of the power source until the speed of the power source is greater than a given value so that the power source provides a given output. Specifically, the power source activating means supplies through the fuel supply controllers fuel to the internal combustion engine at all times until the speed of the power source is greater than the given value.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 2(a) is a time chart which shows a variation in required torque of a power source;

FIG. 2(b) is a time chart which shows a variation in fuel supply rate;

FIG. 2(c) is a time chart which shows a fuel supply control cycle of an internal combustion engine;

FIG. 2(d) is a time chart which shows an output torque of a generator-motor;

FIG. 17 is a flowchart of a program performed by the transmission control unit shown in FIG. 15;

DESCRIPTION OF THE PREFERRED EMBODIMENT

Figure 1:
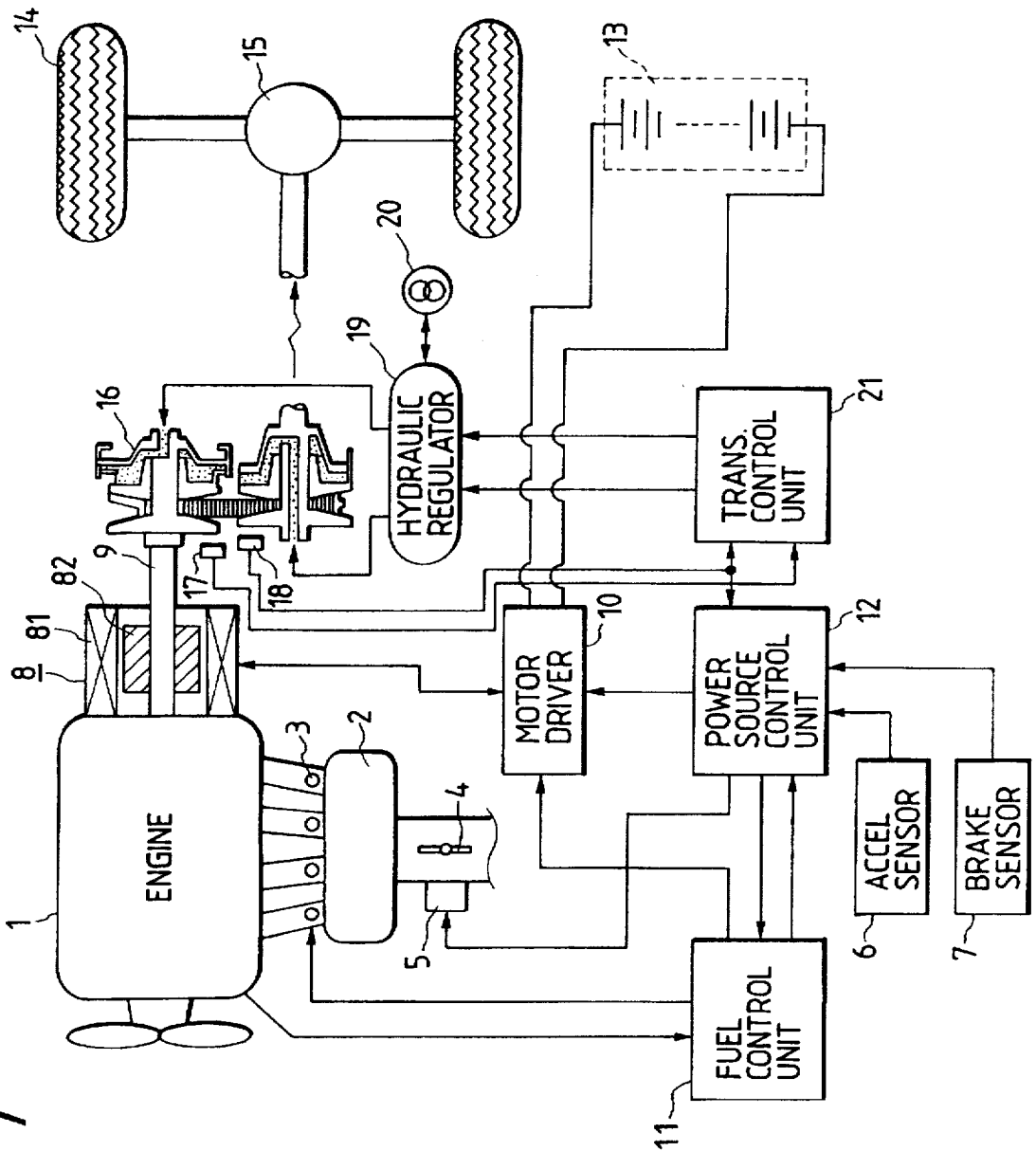
FIG. 1 is a block diagram which shows a parallel hybrid vehicle equipped with a power source control system of the invention.

Referring now to the drawings, particularly to FIG. 1, there is shown a parallel hybrid vehicle equipped with a power source control system according to the present invention.

The hybrid vehicle includes generally an internal combustion engine 1, fuel injection solenoid valves 3, a throttle actuator 5, an accelerator sensor 6, and a brake sensor 7.

The internal combustion engine 1 is, for example, a conventional in-line four-cylinder gasoline engine. The fuel injection solenoid valves 3 are installed in an intake monifold 2, one for each cylinder, to provide mixtures to the cylinders, respectively, which are ignited by an ignition system (not shown). The throttle actuator 5 is provided with a pulse motor selectively opening and closing a throttle valve 4 to adjust the quantity of intake air. The accelerator sensor 6 includes a known potentiometer which is responsive to movement of an accelerator pedal (not shown) depressed by a vehicle operator to provide a voltage signal indicative of the degree of movement of the accelerator pedal (hereinafter, referred to as an accelerator-manipulated variable ACC). The brake sensor 7 is responsive to movement of a brake pedal (not shown) depressed by the vehicle operator to provide an ON/OFF switching signal (hereinafter, referred to as a brake-manipulated variable BRK) indicating whether the brake pedal is depressed or not.

The hybrid vehicle also includes a generator-motor 8, a generator-motor drive unit 10, a fuel control unit 11, a power source control unit 12, a battery unit 13, a continuously variable transmission 16, speed sensors 17 and 18, a hydraulic regulator 19, a hydraulic source 20, and a transmission control unit 21.

The generator-motor 8 is a permanent-magnet three-phase motor consisting of a stator 81 and a rotor 82, having two pairs of poles. Specifically, U-, V-, and W-phase windings are disposed on the stator 81. The rotor 82 is made of a permanent magnet. The generator-motor 8 is provided with a rotor position detector (not shown) such as a resolver which provides a rotor angular position signal to the generator-motor drive unit 10. The generator-motor 8 is disposed within a housing (not shown). The rotor 82 is mounted on an output shaft 9 connecting an output shaft of the engine 1 and the continuously variable transmission 16.

The generator-motor drive unit 10 includes a three-phase inverter and a microcomputer which controls the generator-motor 8 in response to speed, torque, and power control signals.

The fuel control unit 11 is a modification of a conventional fuel control system for internal combustion engines, as will be discussed later in detail, which determines the degree of opening of the fuel injection solenoid valves 3 based on the quantity of intake air of the internal combustion engine 1 measured by an intake air flow sensor installed in the intake monifold 2 and the engine speed measured by a speed sensor installed on the engine 1 to determine a supply of fuel to the engine 1 and to interrupt the supply of fuel according to an operational command from the power source control unit 12.

The power source control unit 12 determines a required torque M* (unit: Nm) of a power source (i.e., the internal combustion engine 1 and the generator-motor 8) based on the accelerator-manipulated variable ACC, the brake-manipulated variable BRK, the engine speed derived by the fuel control unit 11, and the vehicle speed derived by the speed sensor 18 to direct the fuel control unit 11 to supply the fuel or interrupt the supply of fuel to the engine 1 so that an output torque from the power source reaches the required torque M* and also determines a required torque Mm* of the generator-motor 8 to control the generator-motor 8.

The battery unit 13 consists of a plurality of lead acid batteries coupled in series which are connected to the generator-motor drive unit 10.

The continuously variable transmission 16 is designed to change the gear ratio in a continuous form by hydraulically changing the diameters of input and output pulleys on which a power transmission belt is wound and transmits the torque from the output shaft 9 to driven wheels 14 through a differential gear 15.

The speed sensors 17 and 18 measure the speeds N1 and N2 of the input and output pulleys of the transmission 16 to provide pulse signals indicative thereof, respectively. The transmission control unit 21 provides a gear shift signal R, as will be discussed later in detail, to the hydraulic regulator 19 based on the speeds N1 and N2 to control hydraulic pressure supplied from the hydraulic source 20 to the input and output pulleys of the transmission 16.

Figure 3:
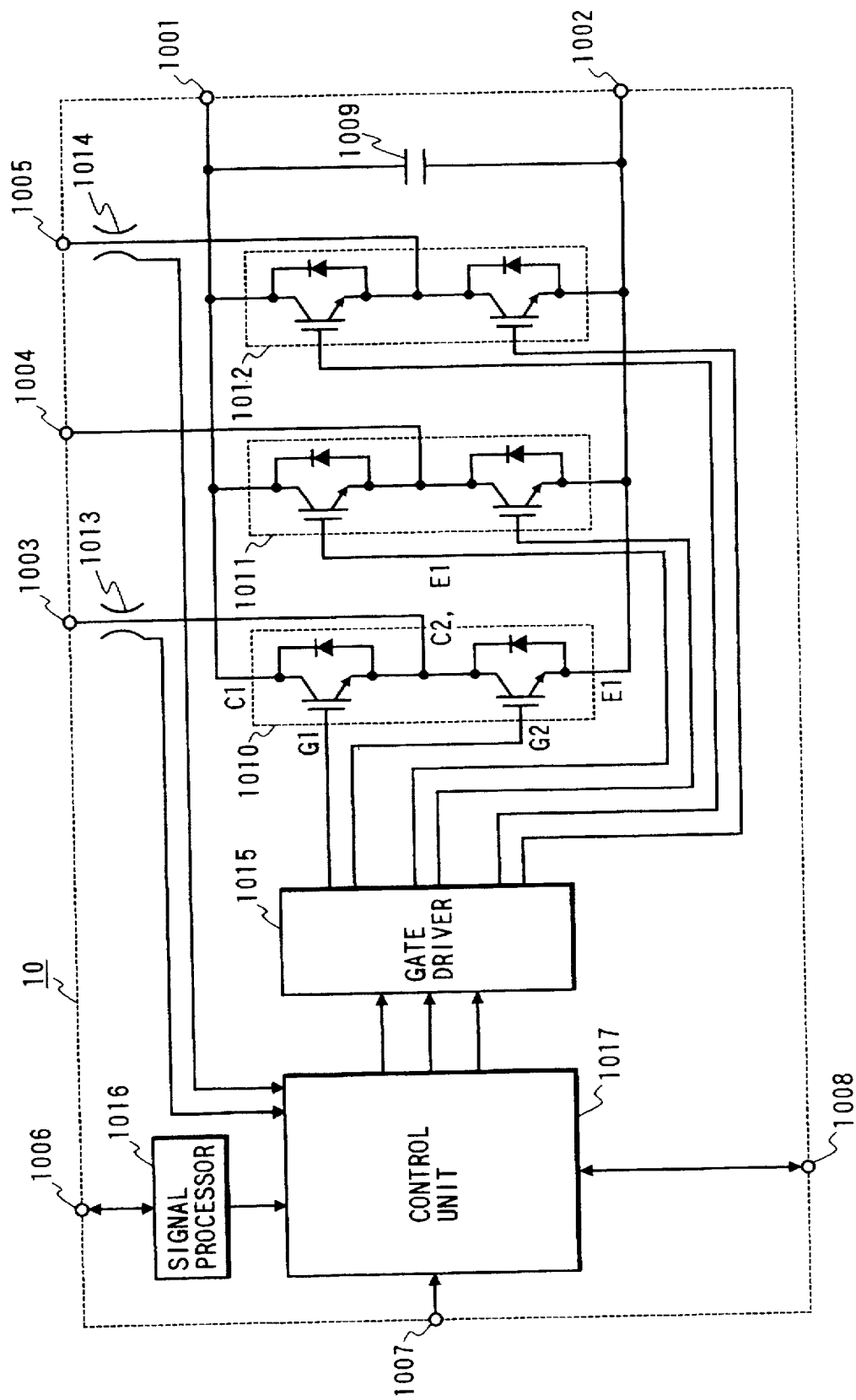
FIG. 3 is a block diagram which shows a circuit structure of a generator-motor control unit.

FIG. 3 shows a circuit structure of the generator-motor drive unit 10.

The electric power is provided from the battery unit 13 through positive and negative terminals 1001 and 1002. Output terminals 1003, 1004, and 1005 are connected to the U-, V-, and W-phase windings of the stator 81 of the generator-motor 8, respectively. A terminal 1006 is connected to the rotor position sensor installed in the generator-motor 8, selectively supplies an energizing signal, and receives rotor angular position signals (i.e., a sin signal and a cos signal). A fuel injection timing signal is inputted through an input terminal 1007 from the fuel control unit 11.

A communication terminal 1008 is connected to the power source control unit 12 for serial transmission. A capacitor 1009 and IGBT modules 1010, 1011, and 1012 are disposed between the input terminals 1001 and 1002. Each of the IGBT modules has a conventional structure consisting of two IGBT elements and two flywheel diodes. Terminals C1, E1, and C2E1 of the IGBT module 1010 are connected to the input terminal 1001, the input terminal 1002, and the output terminal 1003 to energize the U-phase winding of the generator-motor 8. Similarly, the IGBT modules 1011 and 1012 serve to energize the V-phase and W-phase windings of the generator-motor 8, respectively.

The generator-motor drive unit 10 also includes current sensors 1013 and 1014, a gate driver 1015, a signal processor 1016, and a control unit 1017. The current sensors 1013 and 1014 are of a non-contact clamping type using a hall element and measure current flowing through the terminals 1003 and 1005 to provide voltage signals indicative thereof. The gate driver 1015 drives gates of the IGBT elements of the IGBT modules 1010, 1011, and 1012. The signal processor 1016 outputs from the terminal 1006 an energizing signal in the form of a sine wave of about 7 kHz to the rotor position detector installed in the generator-motor 8 and receives the rotor angular position signals (ie., the sin signal and the cos signal) from the rotor position detector through the terminal 1006 to provide a 10-bit parallel signal indicating the angular position of the rotor 82.

The control unit 1017 is formed with a microcomputer consisting of a single chip and performs known vector control according to a program, as will be discussed later, stored in an internal ROM based on the required torque Mm* of the generator-motor 8 inputted from the terminal 1008, a fuel injection timing signal inputted from the terminal 1007, the rotor angular position signals outputted from the signal processor 1016, and the currents flowing through the U- and W-windings of the stator 81 of the generator-motor 8 determined by the current sensors 1013 and 1014 so that an output torque of the generator-motor 8 reaches the required torque Mm*.

Figure 4:
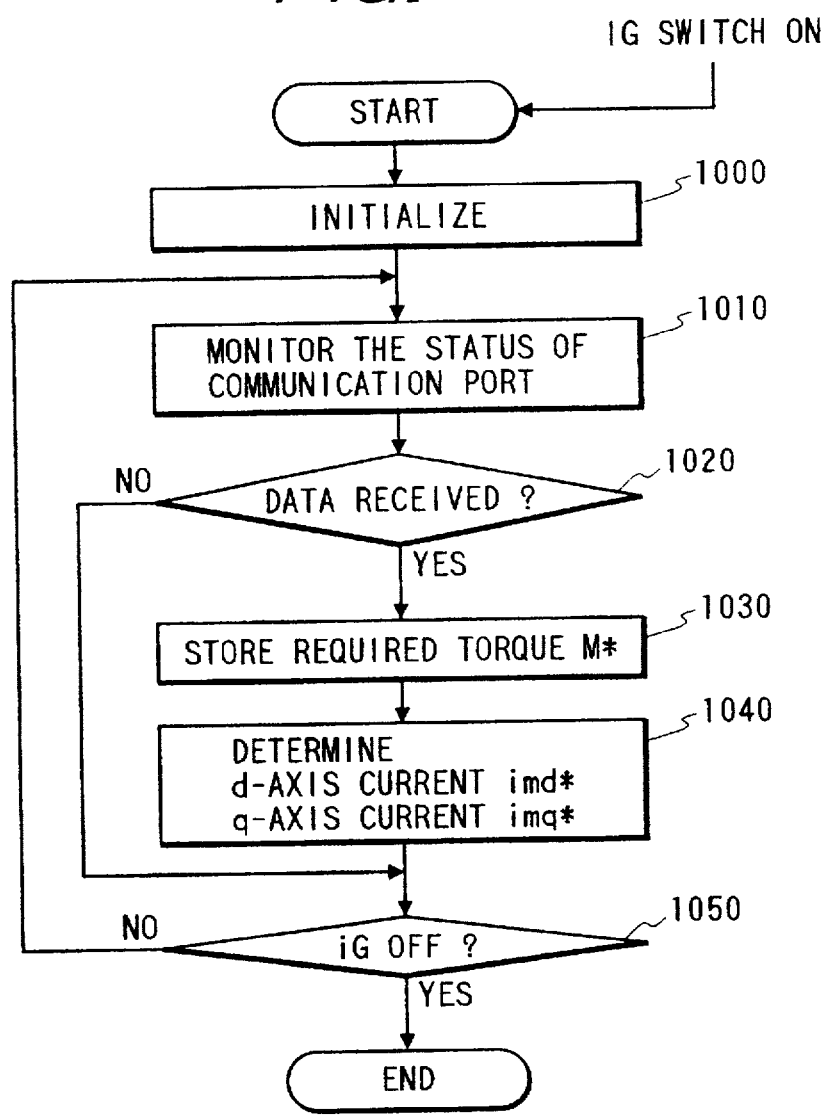
FIGS. 4 and 5 is a flowchart of a program performed by the generator-motor control unit shown in FIG. 3.
Figure 5:
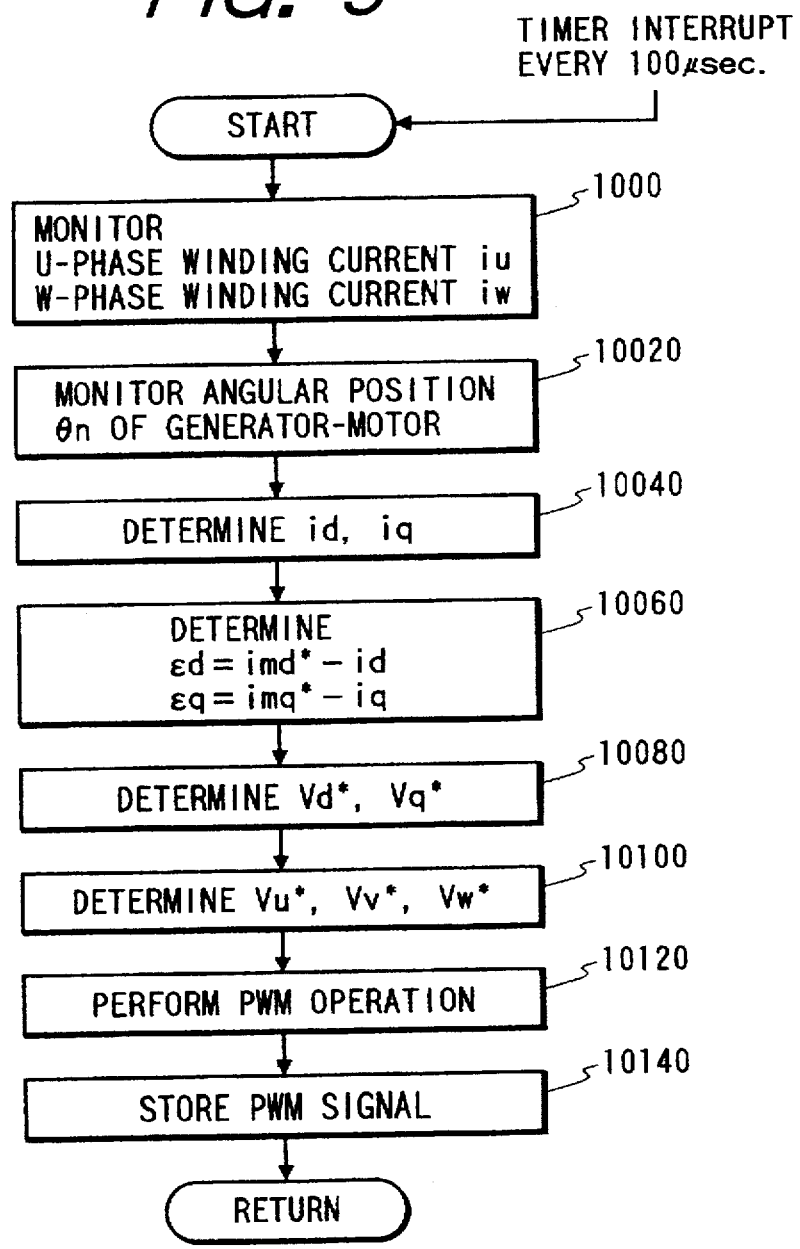

FIGS. 4 and 5 show a flowchart of the program stored in the ROM of the control unit, consisting of a main routine and a subroutine.

Upon turning on of an ignition switch IG of the vehicle, the routine proceeds to step 1000 wherein variables (e.g., a d-axis current signal imd* and a q-axis current signal imq* as will be described later) stored in a RAM of the control unit 1017, a stack thereof, and a general purpose resistor such as an input/output port are initialized.

The routine proceeds to step 1010 wherein the status of a communication port provided in the control unit 1017 is monitored to read out a flag indicating the reception of data about the required torque Mm*.

The routine then proceeds to step 1020 wherein it is determined whether the communication port has received the data or not. If a NO answer is obtained, then the routine proceeds directly to step 1050. Alternatively, if a YES answer is obtained, then the routine proceeds to step 1030 wherein the required torque Mm* is stored in a variable memory location of the RAM.

The routine proceeds to step 1040 wherein the d-axis current signal imd* and the q-axis current signal imq* that indicate current components supplied to the phase-windings of the stator 81 of the generator-motor 8 as expressed using a d-q coordinate system defined by a d-axis indicating the direction of magnetic field of the rotor 82 and a q-axis extending perpendicular to the d-axis, are determined based on the required torque Mm* stored in step 1030.

The routine proceeds to step 1050 wherein it is determined whether the ignition switch IG has been turned off or not. If a NO answer is obtained, then the routine returns back to step 1010. Alternatively, if a YES answer is obtained, then the routine is placed in a halt mode.

FIG. 5 shows an interrupt program executed by timer interrupt every 100 μsec.

After entering the program, the routine proceeds to step 10000 wherein a U-phase winding current iu and a W-phase winding current iw flowing through the U-phase and W-phase windings of the stator 81 of the generator-motor 8 are monitored through the current sensors 1013 and 1014 and stored in the RAM of the control unit 1017.

The routine proceeds to step 10020 wherein an angular position θm of the rotor 82 of the generator-motor 8 is detected and stored in the RAM of the control unit 1017. The routine then proceeds to step 10040 wherein three-phase alternating current flowing through the windings of the stator 81 of the generator-motor 8 is converted into the d-axis current id and the q-axis current iq in the d-q coordinate system based on the U-phase winding current iu, the W-phase winding current iw, and the angular position θm.

The routine proceeds to step 10060 wherein current differences εd and εq between the d-axis current signal imd* and the d-axis current id and between the q-axis current signal imq* and the q-axis current iq are determined, respectively. The routine then proceeds to step 10080 wherein a d-axis voltage Vd* and a q-axis voltage Vq* to be applied to the generator-motor 8 that are voltage components in d and q axes are determined based on the current differences εd and εq derived in step 10060 and an electric constant of the generator-motor 8. The routine then proceeds to step 10100 wherein three-phase voltages Vu*, Vv*, and Vw* are determined based on the d-axis voltage Vd* and the q-axis voltage Vq*. The routine proceeds to step 10120 wherein the three-phase voltages Vu*, Vv*, and Vw* are subjected to pulse-width modulation (PWM) using a modulation frequency of, for example, 10 kHz. The routine proceeds to step 10140 wherein the modulated pulses derived in step 10120 are stored in a PWM resistor installed in the control unit 1017.

Figure 6:
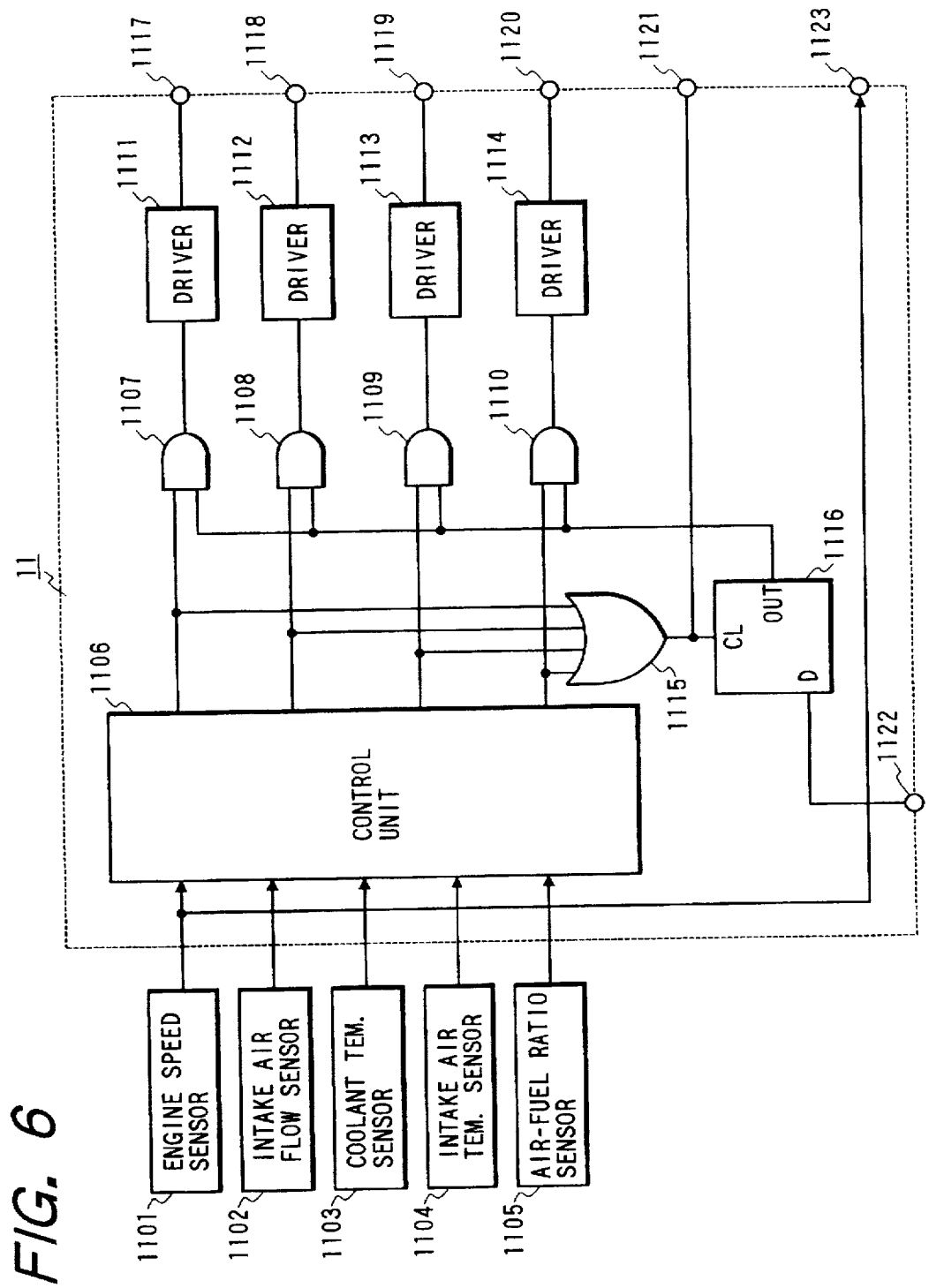
FIG. 6 is a block diagram which shows a circuit structure of a fuel control unit.

FIG. 6 shows a circuit structure of the fuel control unit 11.

The fuel control unit 11 includes generally a control unit 1106, an OR gate 1115, a D flip-flop 1116, two-input AND gates 1107 to 1110, and solenoid valve drivers 1111 to 1114.

The control unit 1106 includes a microcomputer consisting of a single chip and determines the timing where each of the fuel injection solenoid valves 3 is opened based on operating variables of the internal combustion engine 1 provided from an engine speed sensor 1101, an intake air flow rate sensor 1102, a coolant temperature sensor 1103, an intake air temperature sensor 1104, and an air-fuel ratio sensor 1105 to provide injection valve-opening signals.

The engine speed sensor 1101 provides an angular signal ω consisting of 12 pulses and a reference signal G every rotation of a crank shaft of the internal combustion engine 1 to the terminal 1123 in addition to the control unit 1106. The intake air flow rate sensor 1102 is installed in the intake monifold 2 and includes a potentiometer and a vane. The vane is moved according to the volume of intake air drawn into the internal combustion engine 1. The potentiometer measures the degree of movement of the vane to provide a signal indicative of the volume of intake air per unit time to the control unit 1106. The coolant temperature sensor 1103 is installed on the internal combustion engine 1 and includes a thermistor which measures the temperature of coolant of the engine 1 with a variation in resistance and provides a signal indicative thereof to the control unit 1106. The intake air temperature sensor 1104 is installed in the intake air flow rate sensor 1102 and includes a thermistor which measures the temperature of intake air drawn into the engine 1 with a variation in resistance and provides a signal indicative thereof to the control unit 1106. The air-fuel ratio sensor 1105 is installed in an exhaust manifold of the engine 1 and provides a voltage signal indicating an air-fuel ratio of exhaust gas to the control unit 1106.

Each of the AND gates 1107 to the 1110 receives through an input terminal the injection valve-opening signal from the control unit 1106 and through the other input terminal a fuel cut signal from the D flip-flop 1116.

Each of the solenoid valve drivers 1111 to 1114 includes a power transistor which provides a switching signal to corresponding one of the fuel injection solenoid valves 3 through one of terminals 1117 to 1120 in response to an output from corresponding one of the AND gates 1107 to 1110.

The four-input OR gate 1115 performs the inclusive-OR operation on the injection valve-opening signals from the control unit 1106 to provide a fuel injection signal INJ to the D flip-flop 1116 and the terminal 1121. The D flip-flop 1116 which is connected at a data input terminal D to the input terminal 1122 and at a clock input terminal to an output terminal of the OR gate 1115, synchronizes a valve-deactivating signal ENA (i.e., a valve-off signal) inputted from the input terminal 1122 with the fuel injection signal INJ to provide at an output terminal the fuel cut signal FUEL to the AND gates 1107 to 1110.

Figure 7:
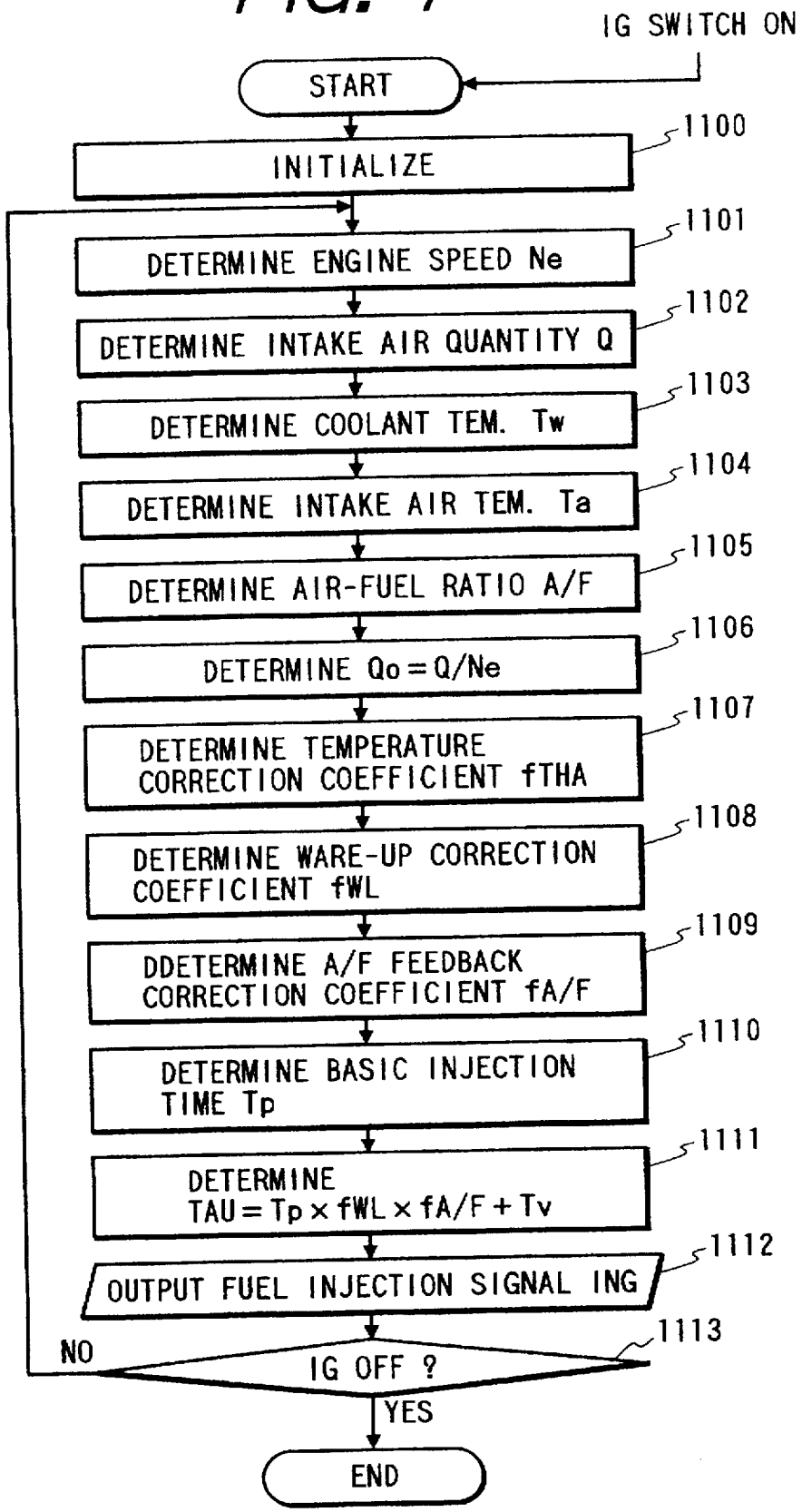
FIG. 7 is a flowchart of a program performed by the fuel control unit shown in FIG. 6.

FIG. 7 shows a fuel control program performed by the control unit 1106 in response to turning on of the ignition switch of the vehicle.

After entering the program, the routine proceeds to step 1100 wherein an input/output port and a stack pointer installed in the control unit 1106 are initialized, and variable memory locations of the RAM are provided.

The routine proceeds to step 1101 wherein an engine speed Ne is determined based on the signals ω and G from the engine speed sensor 1101 and stored in one of the variable memory locations of the RAM. The routine proceeds to step 1102 wherein an intake air quantity Q is determined based on the signal from the intake air flow rate sensor 1102 and stored in one of the variable memory locations of the RAM. The routine proceeds to step 1103 wherein a coolant temperature Tw is determined based on the signal from the coolant temperature sensor 1103 and stored in one of the variable memory location of the RAM. The routine proceeds to step 1104 wherein an intake air temperature Ta is determined based on the signal from the intake air temperature sensor 1104 and stored in one of the variable memory locations of the RAM. The routine proceeds to step 1105 wherein an air-fuel ratio A/F is determined based on the signal from the air-fuel ratio sensor 1105 and stored in one of the variable memory locations of the RAM. The routine proceeds to step 1106 wherein the quantity $Q_0$ of intake air per revolution of the engine 1 is determined based on the engine speed Ne derived in step 1101 and the intake air quantity Q derived in step 1102 and stored in one of the variable memory locations of the RAM.

Figure 8:
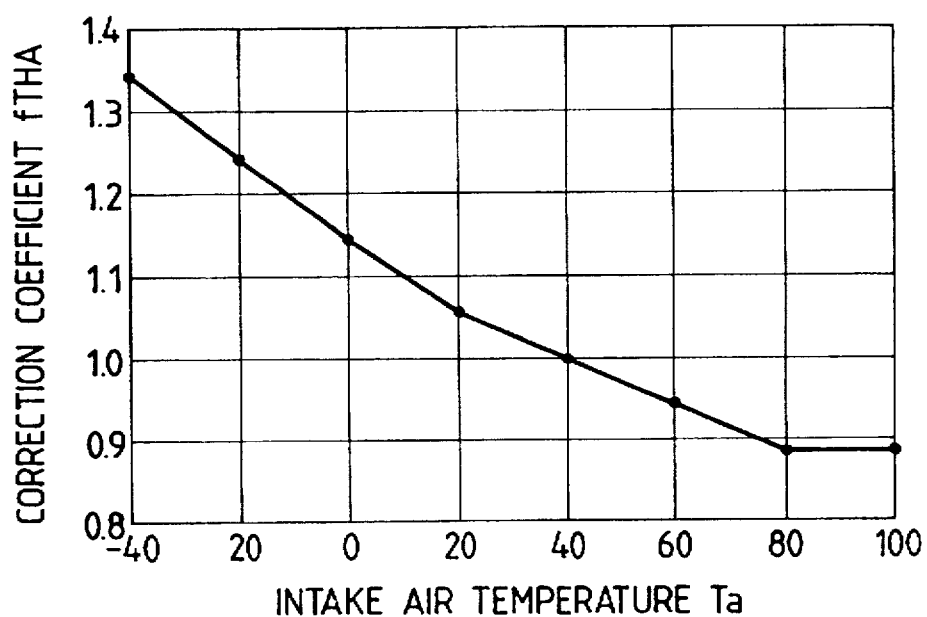
FIG. 8 is a map for determining an intake air temperature correction coefficient in terms of an intake air temperature.

The routine proceeds to step 1107 wherein an intake air correction coefficient fTHA is determined by look-up using an intake air correction map, as shown in FIG. 8, stored in the ROM of the control unit 1106 based on the intake air temperature Ta derived in step 1104. The intake air correction map represents coefficients for converting the quantity of intake air detected by the intake air flow rate sensor 1102 into volume per unit time.

Figure 9:
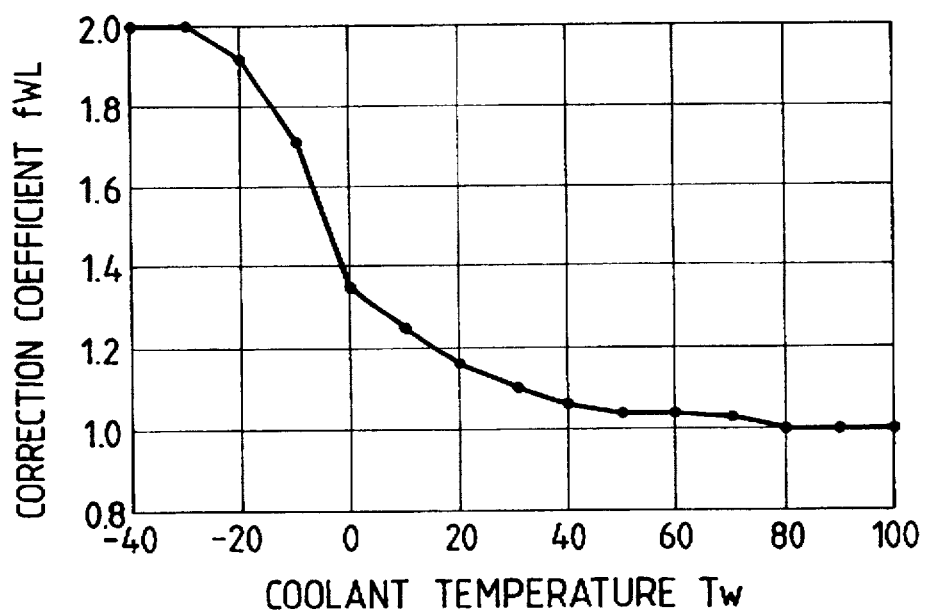
FIG. 9 is a map for determining a warm-up correction coefficient in terms of a coolant temperature.

The routine proceeds to step 1108 wherein a warm-up correction coefficient fWL is determined by look-up using a warm-up correction map, as shown in FIG. 9, based on the coolant temperature Tw derived in step 1103. The routine then proceeds to step 1109 wherein an A/F feedback correction coefficient fA/F is determined based on the air-fuel ratio A/F derived in step 1105 according to a given operation which is known in the art.

The routine then proceeds to step 1110 wherein a basic injection time Tp is determined based on the intake air quantity $Q_0$ derived in step 1106 and the intake air temperature correction coefficient fTHA derived in step 1107 according to the relation of k×$Q_0$×fTHA where k is a constant that determines the relation between the valve-opening time during which the fuel injection solenoid valves 3 are opened and the fuel injection quantity.

The routine proceeds to step 1111 wherein an injection time TAU during which the fuel injection solenoid valves 3 are opened is determined based on the basic injection time Tp, the warm-up correction coefficient fWL, and the A/F feedback correction coefficient fA/F according to the relation of TAU=Tp×fWL×fA/F+Tv where Tv is an inoperative injection time that is a time lag caused by time constant of the fuel injection solenoid valves 3 and that does not contribute to the fuel injection.

The routine proceeds to step 1112 wherein injection signals ING are provided to activate the fuel injection solenoid valves 3 based on the injection time TAU. The routine then proceeds to step 1113 wherein it is determined whether the ignition switch has been turned off or not. If a NO answer is obtained, then the routine returns back to step 1101. Alternatively, if a YES answer is obtained, then the routine terminates.

Figure 10:
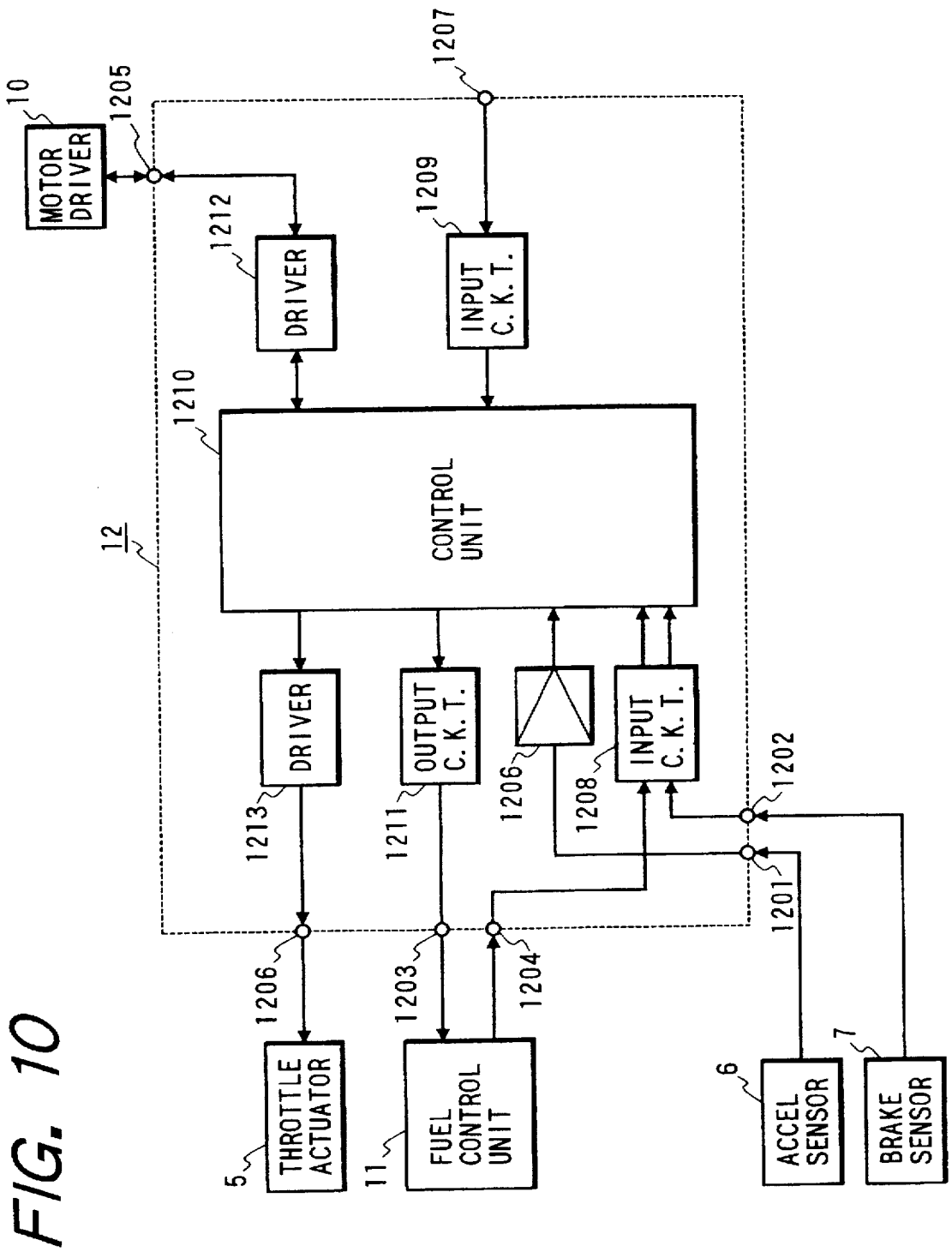
FIG. 10 is a block diagram which shows a circuit structure of a power source control unit.

FIG. 10 shows a circuit structure of the power source control unit 12.

The power source control unit 12 includes generally a pulse motor driver 1213, a digital output circuit 1211, an analog input circuit 1206, a digital input circuit 1208, a control unit 1210, a communication driver 1212, and a pulse input circuit 1207.

The digital output circuit 1211 is connected through an output terminal 1203 to the fuel control unit 11. The analog input circuit 1206 is connected through an input terminal 1201 to the accelerator sensor 6 and formed with a known voltage-amplifying circuit using an operational amplifier which amplifies an input signal from the accelerator sensor 6 to output it to the control unit 1210. The digital input circuit 1208 is connected to the fuel control unit 11 and the brake sensor 7 through input terminals 1204 and 1202, respectively, and includes a known buffer circuit using transistors which converts outputs from the brake sensor 7 and the fuel control unit 11 in impedance to provide the same logical signals. The communication driver 1212 is disposed between a communication port of the control unit 1210 and a communication terminal 1205 connected to the generator-motor drive unit 10. The pulse input circuit 1209 is connected to the speed sensor 18 through an input terminal 1207 and includes a known buffer circuit using transistors which converts an output signal from the speed sensor 18 in impedance to provide the same logical signal.

The control unit 1210 includes a microcomputer consisting of a single chip and receives the accelerator-manipulated variable ACC inputted through the analog input circuit 1216, the brake-manipulated variable BRK and the engine speed Ne inputted through the digital input circuit 1208, and pulse signals of the speed sensor 18 inputted through the pulse input circuit 1209. The control unit 1210 determines the vehicle speed V based on the pulse signals inputted from the speed sensor 18 and provides the valve-off signals ENA for the fuel injection solenoid valves 3, the required torque Mm* of the generator-motor 8, and a throttle valve open angle θ to the fuel control unit 11, the generator-motor drive unit 10, and the throttle actuator 5, respectively, based on the accelerator-manipulated variable ACC, the brake-manipulated variable BRK, the engine speed Ne, and the vehicle speed V.

The digital output circuit 1211 converts the valve-off signals ENA provided by the control unit 1210 in impedance to output them to the fuel control unit 11.

The pulse motor driver 1213 provides a control signal based on the throttle valve open angle θ provided by the control unit 1210 and outputs it through an output terminal 1206 to activate the throttle actuator 5.

Figure 11:
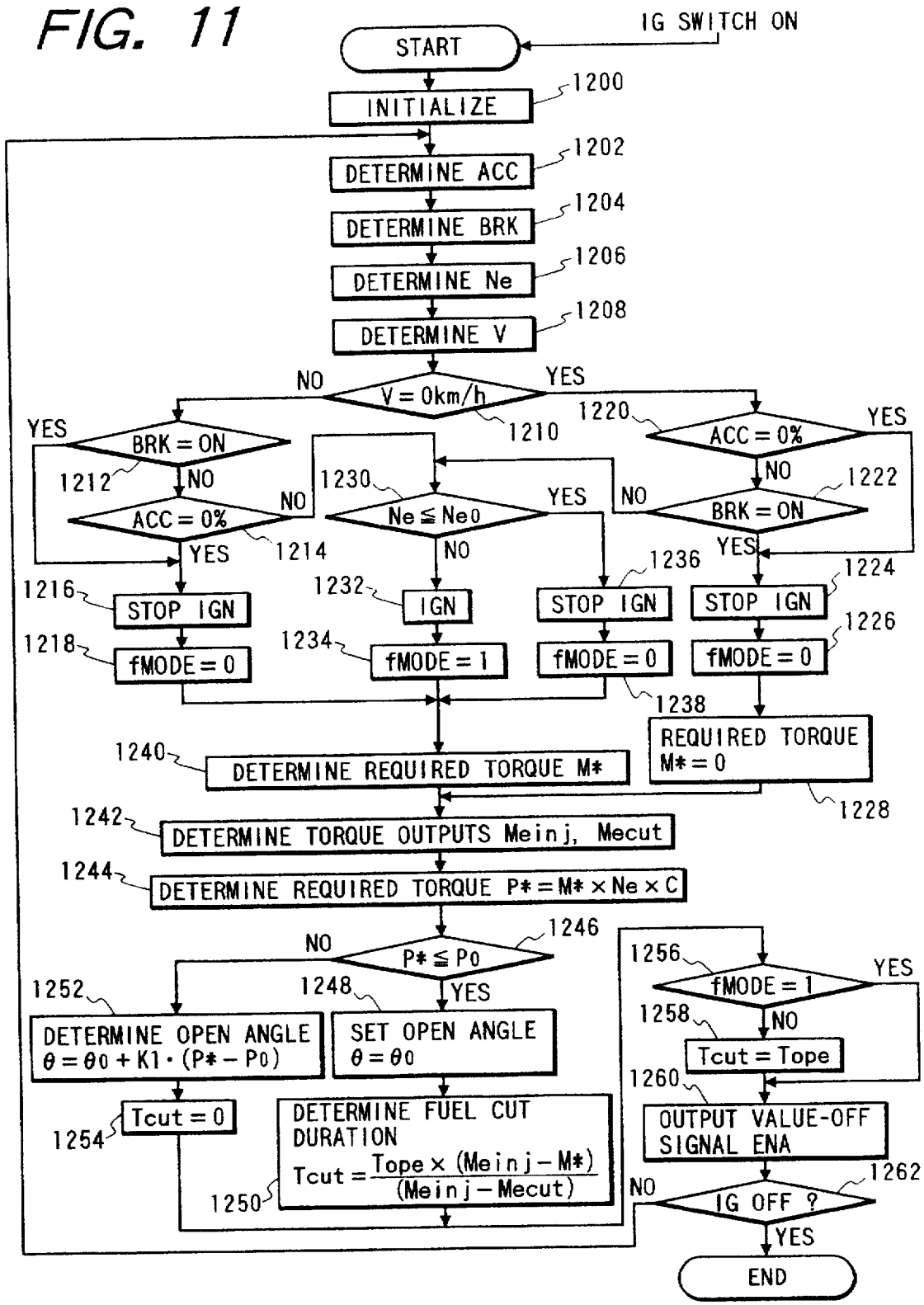
FIGS. 11 and 12 show a flowchart of a program performed by the power source control unit of FIG. 10.
Figure 12:
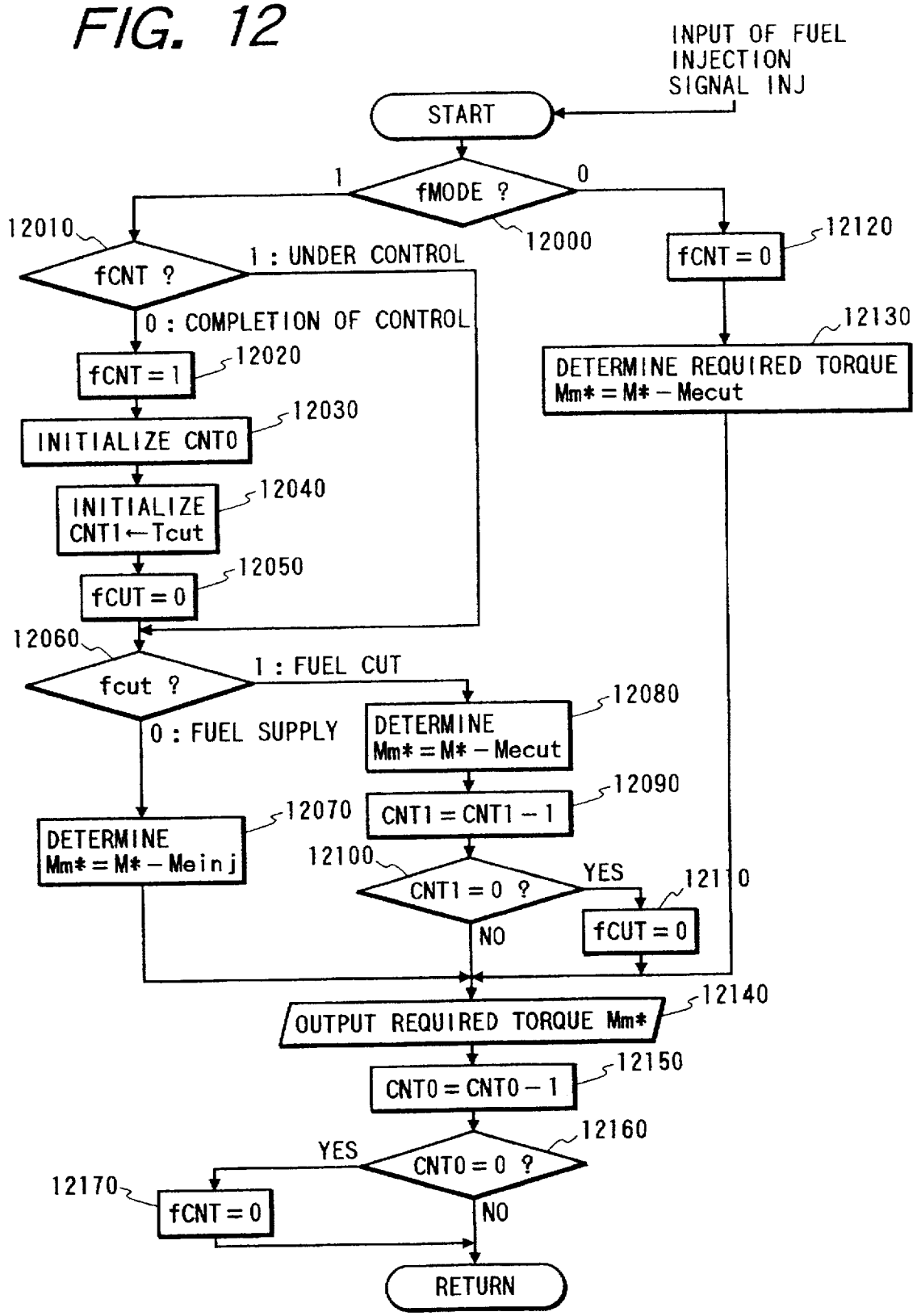

FIGS. 11 and 12 show a flowchart of a program performed by the control unit 1210 in response to turning on of the ignition switch of the vehicle.

After entering the program, the routine proceeds to step 1200 wherein an input/output port in the control unit 1210 and the contents of variables memory locations and stack locations defined in an internal RAM are initialized. Specifically, the throttle valve open angle θ, as will be discussed later, is set to an initial value $θ_0$.

The routine proceeds to step 1202 wherein a voltage output from the analog input circuit 1206 is converted by an A/D converter installed in the control unit 1210 into a digital signal indicative of the accelerator-manipulated variable ACC and stored in one of the variable memory locations of the RAM.

The routine proceeds to step 1204 wherein the brake-manipulated variable BRK is determined in the form of a 1-bit on-off signal based on an output signal from the digital input circuit 1208 and stored in one of the variable memory locations of the RAM. The routine proceeds to step 1206 wherein the engine speed Ne is determined by an output signal from the digital input circuit 1208 and stored in one of the variable memory locations of the RAM. The routine proceeds to step 1208 wherein the frequency of a pulse signal inputted from the pulse input circuit 1209 is monitored to determine the vehicle speed V, and the vehicle speed V is stored in one of the variable memory locations of the RAM.

The routine proceeds to step 1210 wherein it is determined whether the vehicle is stopped or not based on the vehicle speed V derived in step 1208. If a YES answer is obtained (V=0 km/h), then the routine proceeds to step 1220. Alternatively, if a NO answer is obtained (V≠0 km/h), then the routine proceeds to step 1212.

In step 1212, it is determined whether the brake pedal is depressed or not based on the brake-manipulated variable BRK. If a YES answer is obtained, then the routine proceeds directly to step 1216. Alternatively, if a NO answer is obtained, then the routine proceeds to step 1214 wherein it is determined whether the accelerator-manipulated variable ACC shows 0% or not. If a NO answer is obtained meaning that the accelerator pedal is depressed, then the routine proceeds to step 1230. Alternatively, if a YES answer is obtained, then the routine proceeds to step 1216.

In step 1216, the ignition system of the internal combustion engine 1 is maintained deactivated. In step 1218, an operation mode flag fMODE indicating an operation mode of the power source is reset to zero (0). In the operation mode flag fMODE of zero (0), the internal combustion engine 1 is stopped, while the generator-motor 8 is activated as the power source of the vehicle. After step 1218, the routine proceeds to step 1240.

In step 1230, it is determined whether the engine speed Ne derived in step 1206 is smaller than or equal to a given speed Ne0 or not. If a NO answer is obtained (Ne>Ne0), then the routine proceeds to step 1232 wherein the ignition system of the engine 1 is activated. The routine proceeds to step 1234 wherein the operation mode flag fMODE is set to one (1). In the operation mode flag fMODE of one (1), the internal combustion engine 1 is supplied with fuel, and the generator-motor 8 is supplied with the electric power. Specifically, both the internal combustion engine 1 and the generator-motor 8 are used as the power source.

If a YES answer is obtained in step 1230 (Ne≦Ne0), then the routine proceeds to step 1236 wherein the ignition system of the engine 1 is maintained deactivated. The routine then proceeds to step 1238 wherein the operation mode flag fMODE is set to zero (0).

Figure 13:
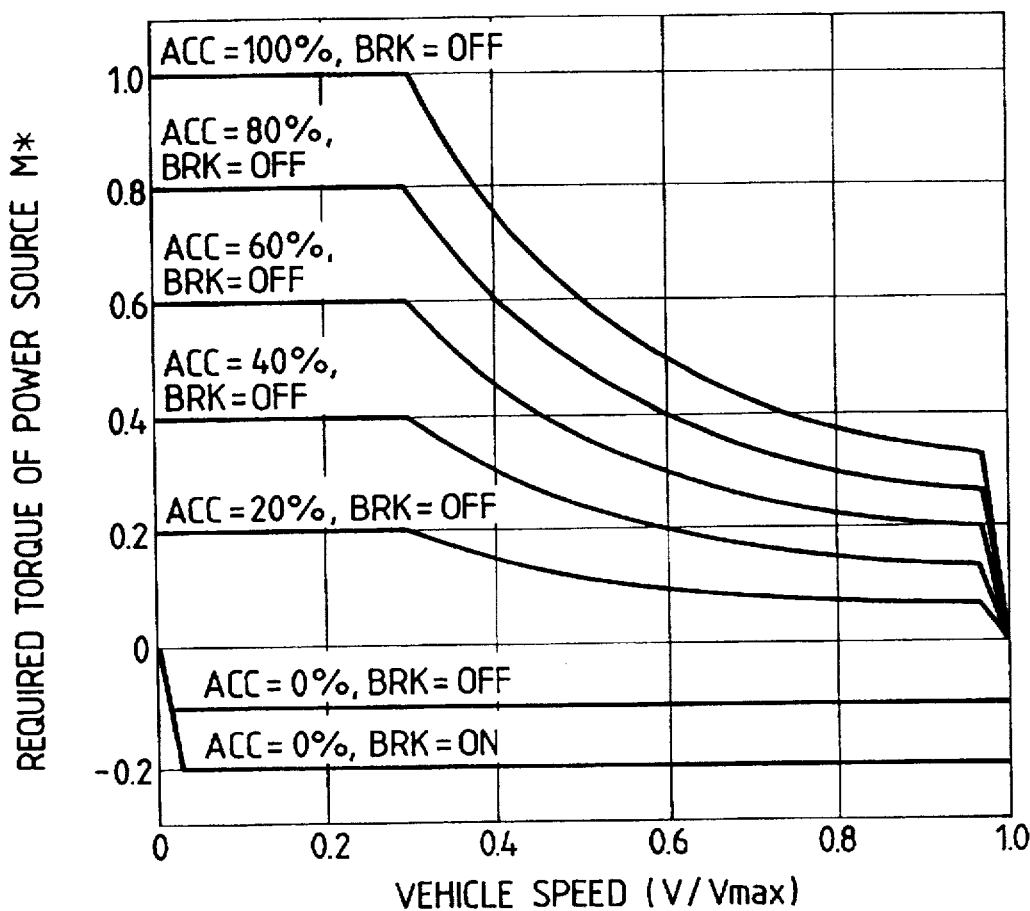
FIG. 13 is a map showing the relation between a required torque of a power source and a vehicle speed in terms of an accelerator-manipulated variable and a brake-manipulated variable.

After step 1218, 1234, or 1238, the routine proceeds to step 1240 wherein the required torque M* of the power source is determined based on the accelerator-manipulate variable ACC derived in step 1202, the brake-manipulated variable BRK derived in step 1204, and the vehicle speed V derived in step 1208 by look-up using a map, as shown in FIG. 13, stored in an internal ROM of the control unit 1210. This map shows the relation between the required torque M* and the vehicle speed V in terms of the accelerator-manipulated variable ACC and the brake-manipulated variable BRK. The required torque M* and the vehicle speed V, as shown in FIG. 13, are normalized by a maximum required torque and a maximum vehicle speed Vmax, respectively, but, in practice, stored in the ROM without being normalized.

If a YES answer is obtained in step 1210 meaning that the vehicle is parked, then the routine proceeds to step 1220 wherein it is determined whether the accelerator-manipulated variable ACC shows 0% or not. If a NO answer is obtained meaning that the accelerator pedal is not depressed, then the routine proceeds directly to step 1224. Alternatively, if a YES answer is obtained, then the routine proceeds to step 1222 wherein it is determined whether the brake pedal is depressed or not based on the brake-manipulated variable BRK. If a YES answer is obtained meaning that the brake pedal is depressed, then the routine proceeds to step 1224. Alternatively, if a NO answer is obtained, then the routine proceeds to step 1230.

In step 1224, the ignition system of the internal combustion engine 1 is maintained deactivated. In step 1226, the operation mode flag fMODE is set to zero (0). In step 1228, the required torque M* of the power source is set to zero (0).

After step 1240 or 1228, the routine then proceeds to step 1242 wherein output torques Meinj and Mecut, as will be described later in detail, of the internal combustion engine 1 are determined by look-up using mapped data and stored in the variable memory locations of the RAM of the control unit 1210.

The routine proceeds to step 1244 wherein a required output P* of the power source is determined based on the required torque M* and the engine speed Ne according to the equation (1) below and stored in one of the variable memory locations of the RAM.

$$P^* = M^* \times Ne \times C \tag{1}$$

where C is a coefficient.

The routine proceeds to step 1246 wherein it is determined whether the required output P* of the power source is smaller than or equal to an output P0 of the engine 1 when operating with an optimum fuel consumption or not. If a YES answer is obtained (P*≦P0), then the routine proceeds to step 1248 wherein the throttle valve open angle θ is set to a value θ0 stored in the ROM in order to operate the internal combustion engine 1 with a minimum fuel consumption. The routine proceeds to step 1250 wherein a fuel cut duration Tcut is determined according to the equation (2) below.

$$Tcut = Tope \times (Meinj - M^*)/(Meinj - Mecut) \tag{2}$$

where Tope is a fuel supply control cycle during which the fuel supply to the internal combustion engine 1 is selectively performed and interrupted and determined based on the number of combustion cycles and the engine speed Ne. In this embodiment, Tope is set to 100 combustion cycles of the engine 1. Meinj and Mecut represent output torques when the engine is supplied with fuel and when it undergoes a fuel cut, respectively, and derived by look-up using mapped data, as shown in FIG. 14, stored in the ROM of the control unit 1210.

Figure 14:
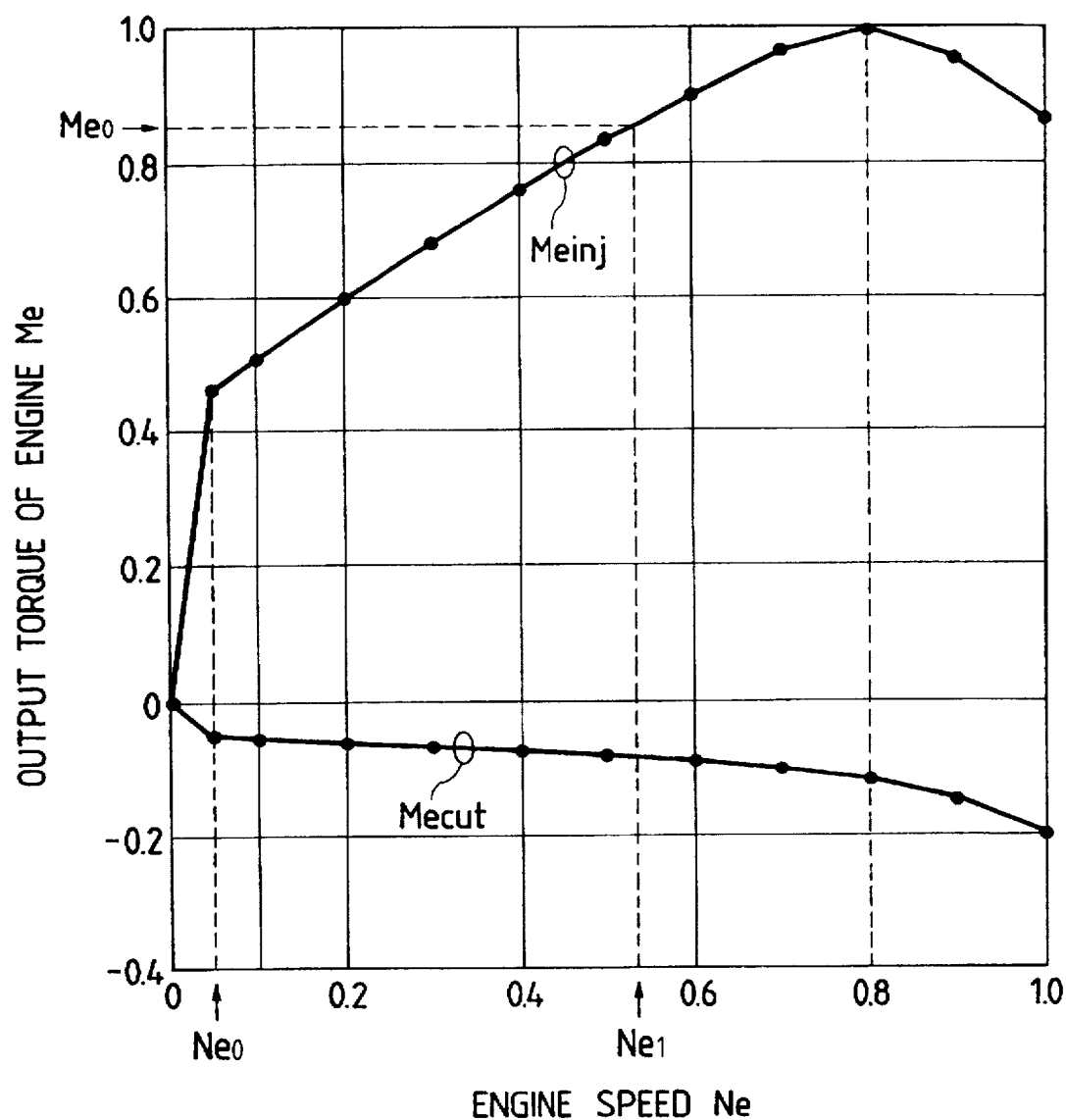
FIG. 14 is a map which shows the relation between an output torque of an internal combustion engine and an engine speed during fuel supply and fuel cut.

The map in FIG. 14 shows the relation between the engine speed Ne when the throttle valve open angle θ of the throttle valve 4 is set to θ0 at which the engine 1 operates with a minimum fuel consumption and an output torque Me of the engine 1. The engine speed Ne is normalized based on a maximum engine speed, and the engine output torque Me is normalized based on a maximum engine output when the throttle valve open angle is θ0. The engine output torque Me represents in a positive range the output torque Meinj when the throttle valve open angle θ of the throttle valve 4 is set to θ0 at which the internal combustion engine 1 burns at high efficiency and in a negative range the output torque Mecut indicating loss of torque caused by friction occurring at the engine 1 during a fuel cut. Note that in the drawing, data when the engine speed Ne is less than Ne0 shows dummy data.

If a NO answer is obtained in step 1246 meaning that the required output P* is greater than the output P0 of the engine 1 when operating with the most economical fuel consumption, then the routine proceeds to step 1252 wherein the throttle valve open angle θ is determined according to the equation (3) below and outputted to the pulse motor driver 1213.

$$\theta = \theta 0 + K1 \cdot (P^* - P0) \quad (3)$$

The throttle valve open angle θ may alternatively be determined by look-up using a two-dimensional map in terms of the engine speed Ne and the output torque Me of the internal combustion engine 1.

After step 1252, the routine proceeds to step 1254 wherein the fuel cut duration Tcut is set to zero (0). The routine proceeds to step 1256 wherein it is determined whether the operation mode flag fMODE is one (1) or not. If a YES answer is obtained (fMODE=1), then the routine proceeds directly to step 1260. Alternatively, if a NO answer is obtained (fMODE=0), then the routine proceeds to step 1258 wherein the fuel cut duration Tcut is set to Tope. The routine then proceeds to step 1260 wherein the valve-off signal ENA is provided using a timer installed in the control unit 1210 based on the fuel cut duration Tcut derived in step 1254, 1250, or 1258 and outputted to the digital output circuit 1211.

The routine proceeds to step 1262 wherein it is determined whether the ignition switch IG has been turned off or not. If a NO answer is obtained meaning that the ignition switch IG is maintained on, then the routine returns back to step 1202. Alternatively, of a NO answer is obtained, then the routine terminates.

FIG. 12 shows an interrupt program performed each time the fuel injection signal INJ is inputted from the fuel control unit 11 during execution of the main program of FIG. 11.

After entering the program, the routine proceeds to step 12000 wherein it is determined whether the operation mode flag fMODE shows one (1) or zero (0), that is, whether both the internal combustion engine 1 and the generator-motor 8 are operating or only the generator-motor 8 is operating.

If the operation mode flag fMODE shows zero (0) meaning that only the generator-motor 8 is operating as the power source of the vehicle, then the routine proceeds to step 12120 wherein a power source control flag fCNT is set to zero (0). The routine proceeds to step 12130 wherein the required torque Mm* of the generator-motor 8 is determined according the equation (5), as will be described later, and then proceeds to step 1214.

If the operation mode flag fMODE has been determined in step 12000 to show one zero (1) meaning that both the internal combustion engine 1 and the generator-motor 8 are operating as the power source of the vehicle, then the routine proceeds to step 12010 wherein the power source control flag fCNT is checked to determine whether the power output of the power source is under the control of the fuel cut or not. If the power source control flag fCNT shows one (1) meaning that the internal combustion engine 1 is undergoing the fuel cut in the fuel supply control cycle Tope, the routine proceeds directly to step 12050. Alternatively, if the power source control flag fCNT shows zero (0) meaning that the fuel supply control cycle Tope is completed, then the routine proceeds to step 12020 wherein the power source control flag fCNT is set to one (1) meaning that the subsequent fuel supply control cycle Tope has been entered.

The routine proceeds to step 12030 wherein a fuel control count CNT0 is initialized to a time count indicating the length of time of the fuel supply control cycle Tope. The routine proceeds to step 12040 wherein a fuel cut count CNT1 is initialized to a time count indicating the length of time of the fuel cut duration Tcut derived in the main program of FIG. 11. The routine proceeds to step 12050 wherein a fuel flag fCUT which indicates whether the fuel is supplied to the engine 1 (fCUT=0) or not (fCUT=1) is reset to zero (0).

The routine proceeds to step 12060 wherein it is determined whether the fuel flag fCUT shows one (1) or zero (0). If the fuel flag fCUT shows zero (0) meaning that the engine 1 is supplied with fuel, then the routine proceeds to step 12070 wherein the required torque Mm* of the generator-motor 8 is determined based on the required torque M* of the power source and the output torque Meinj of the engine 1 supplied with fuel derived in steps 1240 and 1242 according to the equation (4) below.

$$Mm^* = M^* - Meinj \quad (4)$$

If the fuel flag fCUT shows one (1) in step 12060 meaning that the engine 1 is undergoing the fuel cut, then the routine proceeds to step 12080 wherein the required torque Mm* of the generator-motor 8 is determined based on the required torque M* of the power source and the output torque Mecut of the engine 1 when undergoing the fuel cut derived in steps 1240 and 1242 according to the equation (5) below.

$$Mm^* = M^* - Mecut \quad (5)$$

The routine proceeds to step 12090 wherein the fuel cut count CNT1 is decremented by one. The routine then proceeds to step 12100 wherein it is determined whether the fuel cut count CNT1 is zero (0) or not. If the fuel cut count CNT1 shows zero (0) meaning that the fuel cut duration has been completed, then the routine proceeds to step 12110 wherein the fuel flag fCUT is set to zero (0) and proceeds to step 12140. Alternatively, if a NO answer is obtained in step 12100 meaning that the fuel cut count CNT1 shows one (1), then the routine proceeds to step 12140 wherein the required torque Mm* of the generator-motor 8 derived in step 12070, 12080, or 12130 is outputted to the communication driver 1212.

The routine proceeds to step 12150 wherein the fuel control count CNT0 is decremented by one. The routine proceeds to step 12160 wherein the fuel control count CNT0 is zero (0) or not. If a YES answer is obtained (CNT0=0), then the routine proceeds to step 12170 wherein the control flag fCNT is reset to zero (0) indicating that the fuel supply control cycle Tope has been completed. Alternatively, if a NO answer is obtained in step 12160 meaning that the fuel control is in the fuel supply control Tope, then the routine returns back to the main program as shown in FIG. 11.

Figure 15:
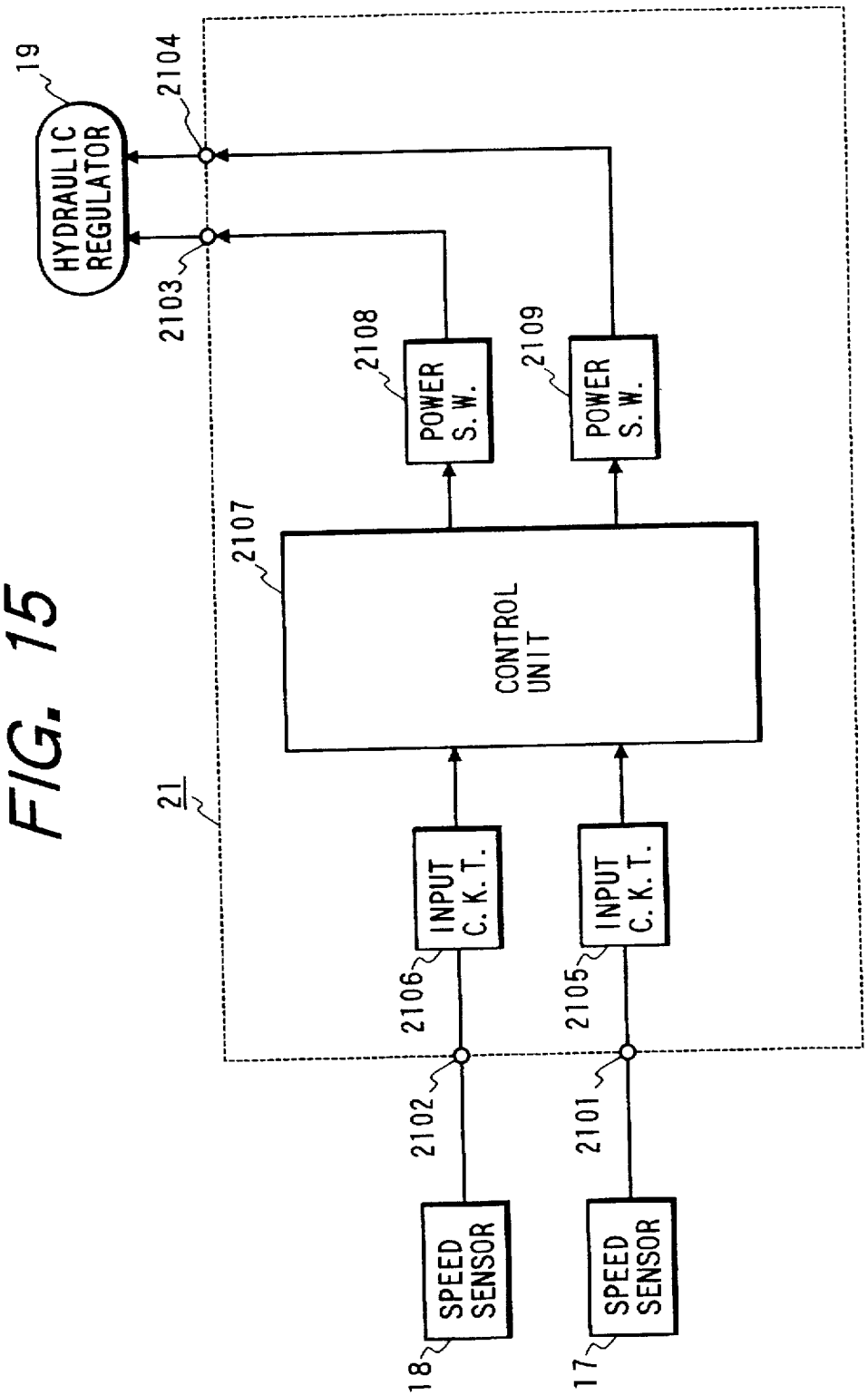
FIG. 15 is a block diagram which shows a circuit structure of a transmission control unit.

FIG. 15 shows a circuit structure of the transmission control unit 21.

The transmission control unit 21 includes pulse input circuits 2106 and 2105, a control unit 2107, and power switches 2108 and 2109.

The pulse input circuit 2106 is connected through an input terminal 2102 to the speed sensor 18 which measures the speed of the output pulley of the continuously variable transmission 16. The pulse input circuit 2105 is connected through an input terminal 2101 to the speed sensor 17 which measures the speed of the input pulley of the continuously variable transmission 16. Each of the pulse input circuits 2106 and 2105 has the same structure as that of the pulse input circuit 1209 of the power source control unit 12 and converts an input signal in impedance to provide an output signal having the same logical variable as that of the input signal to the control unit 2107.

The control unit 2107 includes a microcomputer consisting of a single chip and receives the input speed N1 and the output speed N2 of the continuously variable transmission 16 provided from the pulse input circuits 2105 and 2106, determines the vehicle speed V based on the output speed N2, the reduction ratio G of the differential gear 15, and the radius r of the driven wheels 14 to calculate a target or controlled gear ratio R* of the continuously variable transmission 16, and provides control signals to the hydraulic regulator 19 based on the gear ratio R*.

The power switches 2108 and 2109 include power transistors which amplify the control signals outputted from the control unit 2107 to output input-pulley and output-pulley hydraulic control signals to the hydraulic regulator 19 through output terminals 2103 and 2104, respectively.

FIG. 17 shows a flowchart of a program stored in an internal ROM of the control unit 2107 which is executed in response to the turning on of the ignition switch IG.

After entering the program, the routine proceeds to step 2100 wherein an input/output port in the control unit 2107 and the contents of variables memory locations and stack locations defined in an internal RAM are initialized.

The routine proceeds to step 2102 wherein the frequency of an output signal from the pulse input circuit 2105 is counted to determine the input speed N1 of the input pulley of the continuously variable transmission 16 and stored in one of the variable memory locations of the RAM. Similarly, in step 2104, the frequency of an output signal from the pulse input circuit 2106 is counted to determine the output speed N2 of the output pulley of the continuously variable transmission 16 and stored in one of the variable memory locations of the RAM.

The routine proceeds to step 2106 wherein the vehicle speed V is determined based on the output speed N2 derived in step 2104 according to the equation (6) below.

$$V = C \times r \times N2 / G \qquad (6)$$

Where r is the radius of the driven wheels 14, G is the reduction ratio of the differential gear 15, and C is a coefficient.

Figure 16:
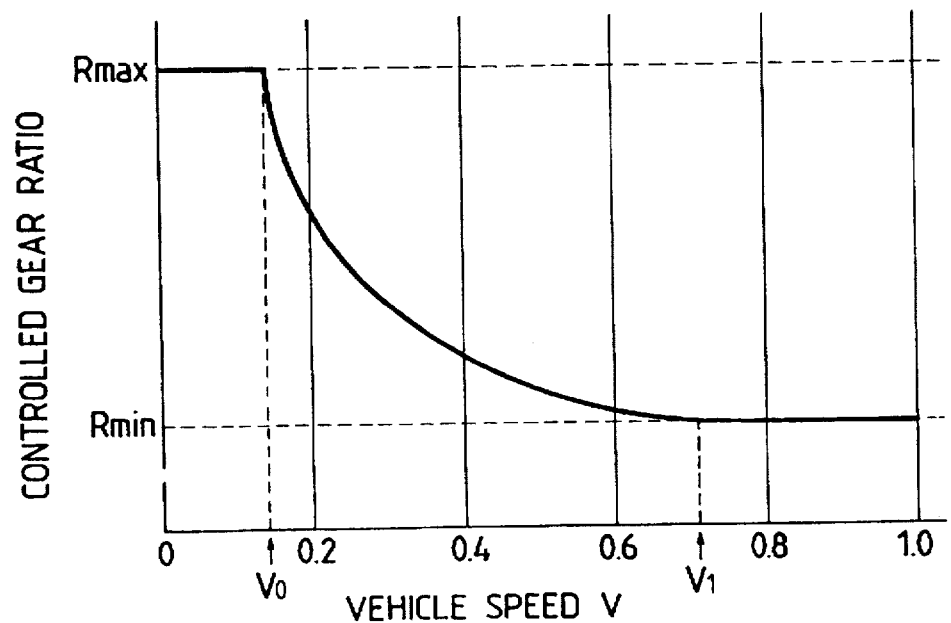
FIG. 16 is a map which shows the relation between a controlled gear ratio of a continuously variable transmission and a vehicle speed.

The routine proceeds to step 2108 wherein the controlled gear ratio R* of the continuously variable transmission 16 is determined based on the vehicle speed V by look-up using mapped data as shown in FIG. 16. In FIG. 16, an abscissa as indicates the vehicle speed V normalized based on a maximum vehicle speed Vmax, while an ordinate axis indicates the controlled gear ratio R*. The gear ratio R of the continuously variable transmission 16 is within a limited gear shift range (usually, from about 0.5 to 3.0) depending upon the structure thereof. The vehicle speeds at a maximum gear ratio Rmax and at a minimum gear ratio Rmin are defined as V0 and V1, respectively. The controlled gear ratio R* at a vehicle speed V0 to V1 is given by the following equation (7).

$$R^* = Ne1 / V \qquad (7)$$

where Ne1 is an engine speed at which the internal combustion engine 1 burns at a maximum efficiency.

The routine proceeds to step 2110 wherein hydraulic control signals are provided based on the controlled gear ratio R* of the continuously variable transmission 16 derived in step 2108 to the power switches 2108 and 2109. The routine then proceeds to step 2112 wherein it is determined whether the ignition switch IG has been turned off or not. If a NO answer is obtained, then the routine returns back to step 2102. Alternatively, if a YES answer is obtained, then the routine terminates.

The system operations described so far will be discussed with reference to a time chart in FIG. 18. The shown time chart represents parameters used in the system and system operations in a rest mode wherein the ignition switch IG is turned off, an idle mode wherein the ignition switch IG is turned on to activate the system, a moderate acceleration mode wherein the accelerator pedal is depressed to accelerate the vehicle slowly, a cruise mode wherein the accelerator pedal is returned to drive the vehicle at a constant speed, a full throttle mode wherein the vehicle is accelerated at the accelerator-manipulated variable ACC of 100%, a high speed cruise mode wherein the engine 1 is throttled from the full throttle mode so as to drive the vehicle at a constant high speed, an engine brake mode wherein the accelerator pedal is returned to the accelerator-manipulated variable of 0% from the constant-high speed traveling mode, a brake-activated mode wherein the brake pedal is depressed from the engine brake mode, an idle mode wherein the vehicle is stopped (i.e., the vehicle speed=0), and a rest mode wherein the ignition switch IG is turned off from the idle mode. Hatched areas at the leftmost side of the drawing indicate the parameters before the system is turned on.

When the ignition switch IG is turned on at time t1, the system is activated and enters the idle mode. In the idle mode, the generator-motor drive unit 10, the fuel control unit 11, the power source control unit 12, and the transmission control unit 21 are turned on to start the programs thereof.

In the generator-motor drive unit 10, the d-axis current signal imd* and the q-axis current signal imq* are reset to zeros, respectively, so that no current is applied to the generator-motor 8. Specifically, the program shown in FIG. 5 is executed by the timer interrupt every 100 μsec to determine in the PWM operation the three-phase voltages Vu*, Vv*, and Vw* so that the current components, as expressed in the d-q coordinate system, flowing through the generator-motor 8 coincide with the d-axis current signal imd* and the q-axis current signal imq*. The three-phase voltages Vu*, Vv*, and Vw* are then stored in the PWM resistor of the control unit 1017. The control unit 1017 provides PWM signals (i.e., three-phase voltages Vu*, Vv*, and Vw*) to the gate driver 1015.

The IGBT modules 1010, 1011, and 1012 perform switching operations in response to outputs from the gate driver 1015 so that the currents applied to the generator-motor 8 through the output terminals 1003, 1004, and 1005 are controlled according to the d-axis current signal imd* and the q-axis current signal imq* which are reset to zeros, respectively. The generator-motor 8 thus outputs no torque.

The internal combustion engine 1 is controlled according to the program, as shown in FIG. 7, executed by the fuel control unit 11. First, in step 1100, the engine speed Ne and the fuel injection time TAU are reset to zeros, respectively, so that no fuel is supplied to the engine 1.

The power source control unit 12 performs the program as shown in FIG. 11. First, in step 1200, the required torque M* of the power source, the required output P* of the power source, the engine speed Ne, the fuel cut duration Tcut, and the vehicle speed V are reset to zeros, respectively, and the throttle valve open angle θ is reset to θ0. In steps 1202 to 1208, the accelerator-manipulated variable ACC, the brake-manipulated variable BRK, the engine speed Ne, and the vehicle speed V are determined. Since in the idle mode, the accelerator-manipulate variable ACC is zero (0), the brake-manipulate variable BRK indicates the ON state, the engine speed Ne and the vehicle speed V are zeros as shown in FIG. 18, the routine proceeds along a 1210→1220→1224→1226→1228 flow. The internal combustion engine 1 is therefore not ignited, and the required torque M* of the power source becomes zero so that the required output P* of the power source is determined in step 1244 to be zero.

Therefore, in step 1246, the condition of P*≦P0 is met. In step 1248, the throttle valve open angle θ which is set to θ0 is provided. In step 12506, the fuel cut duration Tcut is determined. In step 1256, it is determined that the operation mode flag fMODE shows zero (0). In step 1258, the fuel cut duration Tcut is set to Tope so that the engine 1 undergoes the fuel cut constantly.

In the transmission control unit 21, the program as shown in FIG. 17 is executed. First, in step 2100, the controlled gear ratio R* is reset to the maximum gear ratio Rmax that is an upper limit of the gear shift range of the continuously variable transmission 16. The control unit 2107 provides input-pulley and output-pulley hydraulic control signals based on the maximum gear ratio Rmax to the hydraulic control unit 19 through the power switches 2108 and 2109. The hydraulic control unit 19 then adjusts the diameters of the input and output pulleys of the continuously variable transmission 16 to change a gear ratio of the transmission 16 to the maximum gear ratio Rmax. Since the internal combustion engine 1 is deactivated, the required torque Mm* of the generator-motor 8 shows zero, the required output P* shows zero, and the vehicle speed V shows zero so that the vehicle is stopped.

When the brake pedal is released and the accelerator pedal is depressed by the vehicle operator in the idle mode, it will cause the moderate acceleration mode to be entered at time t2. Since the engine speed Ne and the vehicle speed V still show zeros at time 2, respectively, the power source control unit 12 determines in step 1210 of FIG. 11 that the vehicle speed V is zero. The routine then proceeds to step 1220 wherein it is determined that the accelerator-manipulated variable ACC is not zero (0%). In the following step 1222, it is determined that the brake-manipulated variable BRK is changed from the ON-level to the OFF-level, and the routine proceeds to step 1230.

In step 1230, it is determined whether the engine speed Ne is smaller than or equal to Ne0 or not that is an initial engine speed at which the internal combustion engine 1 has entered a combustion cycle and that is set to a given speed from 300 rmp to 100 rmp in this embodiment. During a time period from time t2 to time t10, it is determined in step 1230 that the engine speed Ne is smaller than or equal to Ne0. The ignition of the engine 1 is thus maintained stopped in step 1236. In step 1238, the operation mode flag fMODE is set to zero (0).

In step 1240, the required torque M* of the power source is determined by look-up using the map shown in FIG. 13. When the required torque M* rises at time t2, it is determined in step 1256 that the operation mode flag fMODE shows zero (0). It is also determined in step 12000 of the interrupt program of FIG. 12 that the operation mode flag fMODE shows zero (0). The routine proceeds along a 12120→12130→12140 flow. In step 12130, the required torque Mm* of the generator-motor 8 that is the sum of the required torque M* of the power source and loss of torque caused by the friction occurring at the engine 1 during non-combustion is determined according to the equation (5). In step 12140, the required torque Mm* of the generator-motor 8 is outputted to the generator-motor drive unit 10 through the communication driver 1212. The generator-motor drive unit 10 then performs the programs as shown in FIGS. 4 and 5 to control the generator-motor 8 so that it outputs the torque equal to the required torque Mm*.

Specifically, at time t2, the required torque Me* of the internal combustion engine 1 shows a negative value, while the required torque Mm* of the generator-motor 8 is increased to a given level. The vehicle is powered by the generator-motor 8 from time t2 so that the vehicle speed V rises as shown in FIG. 18.

The controlled gear ratio R* of the continuously variable transmission 16 is maintained at the maximum gear ratio Rmax according to the map shown in FIG. 16 until the vehicle speed V reaches V0 at time 11. Therefore, the torque that is proportional to the product of the required torque M* of the power source and the controlled gear ratio R* of the continuously variable transmission 16 acts on the driven wheels 14 to accelerate the vehicle.

At time t10 when the engine speed Ne is increased to reach Ne0, a NO answer is obtained in step 1230 of the program shown in FIG. 11, and the routine proceeds to step 1232 wherein the internal combustion engine 1 enters a combustion mode. In step 1234, the operation mode flag fMODE is set to one (1) so that the vehicle is powered by both the engine 1 and the generator-motor 8 until time t6.

The torque control of the internal combustion engine 1 and the generator-motor 8 from time t10 to time t6 will be discussed below with reference to FIGS. 2(a) to 2(c) and 19.

Figure 19:
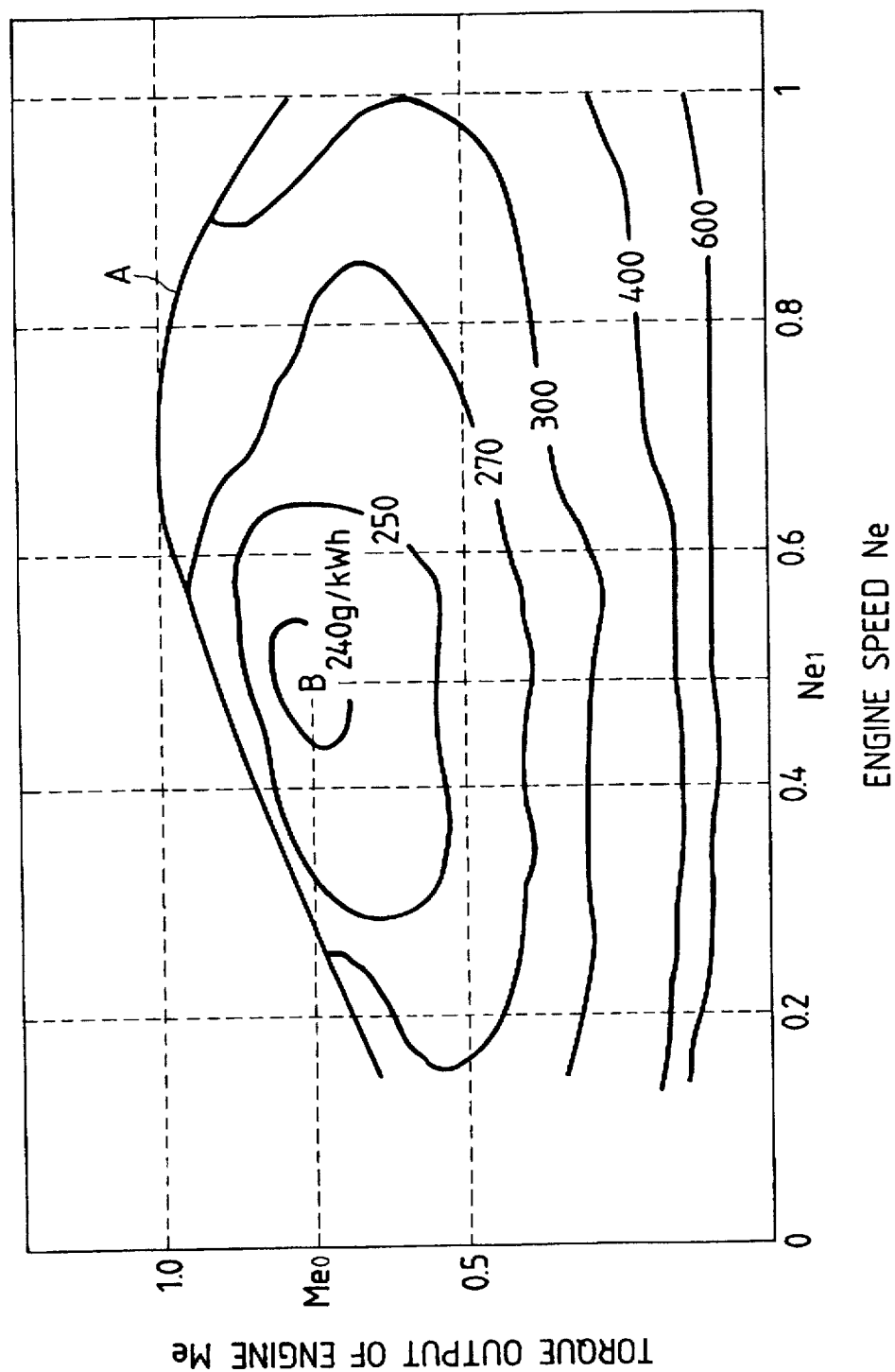
FIG. 19 is a graph which shows fuel consumption rates in terms of an output torque of an internal combustion engine and an engine speed.

FIG. 19 shows fuel economy levels of the internal combustion engine 1 in terms of engine output torque Me and engine speed Ne when the throttle valve open angle θ is changed. The curve A indicates a variation in torque when the throttle valve 4 is fully opened. Other curves indicate fuel consumption rates each expressed by a fuel consumption (g) per power (kWh) within a torque band of the internal combustion engine 1. An economical fuel consumption lies near a point B indicated by an engine speed Ne1 and an output torque Ne0.

FIGS. 2(a) to 2(d) show how to control the internal combustion engine 1 and the generator-motor 8 for changing a torque output of the power source while operating the engine 1 with the economical fuel consumption (Ne=Ne1, Me=Me0) when the required torque M* of the power source is changed. A fuel supply rate α, as shown in FIG. 2(b), is so adjusted that the internal combustion engine 1 provides the required torque M* of the power source while operating with the economical fuel consumption.

FIGS. 2(c) and 2(d) are time charts, as correspond to an area A in FIGS. 2(a) and 2(b), which show the operation of the internal combustion engine 1 and the torque output of the generator-motor 8, respectively.

When fuel is injected into the engine 1, the positive torque Meinj is outputted. When the engine 1 undergoes a fuel cut, the negative output torque Mecut is outputted which is caused by the friction of moving parts of the engine 1. Usually, in gasoline-powered vehicles, adjustment of a torque output is accomplished by opening and closing a throttle valve, but it is, as can be seen from FIG. 19, difficult to operate an engine at all times with an economical fuel consumption.

Accordingly, in this embodiment, the adjustment of a torque output of the internal combustion engine 1 with the economical fuel consumption (Ne=Ne1, Me=Me0) is achieved by supplying fuel to the engine 1 and subjecting the engine 1 to a fuel cut cyclically, modifying a ratio of the fuel supply duration to the fuel cut duration Tcut to change the torque output of the engine 1, and compensating for a variation in torque output of the engine 1 generated during the fuel supply and fuel cut durations using the generator-motor 8. The fuel supply control cycle Tope is determined based on an output resolution of the power source. For example, the fuel supply duration providing the positive output torque Meinj and the fuel cut duration providing the negative output torque Mecut may be changed with a resolution of 1/100 by setting the fuel supply control cycle Tope to a time period during which the engine 1 experiences a combustion cycle 100 times.

When the fuel cut duration Tcut is provided within the fuel supply control cycle Tope, a torque output of the power source is given by the equation (8) below.

$$M=(Mecut \times Tcut + Meinj \times (Tope-Tcut))/Tope \quad (8)$$

The output torque Me of the internal combustion engine 1 appears as pulse-shaped vibrations over the fuel supply duration and the fuel cut duration. These vibrations are eliminated by operating, as shown in FIGS. 2(c) and 2(d), the generator-motor 8 in a generator mode during the fuel supply duration and in a motor mode during the fuel cut duration so as to output the required torque Mm* corresponding to a difference between the required torque M* of the power source and the output torque Me of the internal combustion engine 1. This allows the internal combustion engine 1 to operate in the fuel supply duration with the economical fuel consumption as indicated by the point B in FIG. 19 and the output torque Me thereof to be changed as required.

Figure 18:
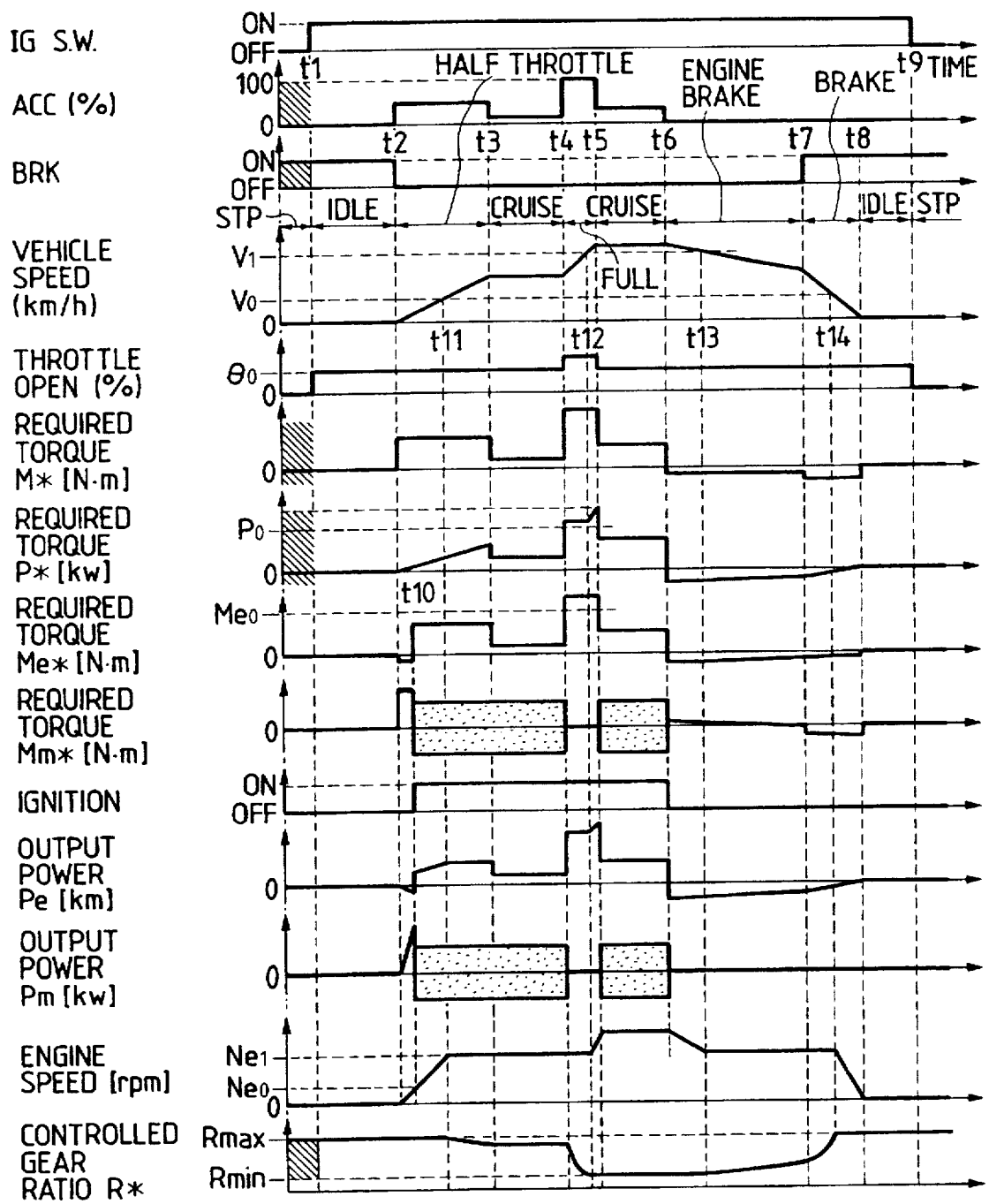
FIG. 18 is a time chart of system operations.

During a period of time from t10 to t6 in FIG. 18, the internal combustion engine 1 and the generator-motor 8 are controlled as discussed in FIGS. 2(a) to 2(d). Specifically, in step 1250 of FIG. 11, the fuel cut duration Tcut is determined based on the required torque M* of the power source according to the equation (2). In step 1260, the valve-off signals ENA are provided to the fuel control unit 11. The fuel control unit 11 then provides at the D flip-flop 1116 the fuel cut signal FUEL in synchronism with the fuel injection signal INJ. Each of the AND gate 1107, 1108, 1108, and 1110 receives the fuel cut signal FUEL and closes corresponding one of the fuel injection solenoid valves 3 to have the internal combustion engine 1 undergo the fuel cut in synchronism with the fuel injection timing.

The fuel cut signal FUEL is also outputted from the output terminal 1121 of the fuel control unit 11 to the power source control unit 12. The power source control unit 12 performs the interrupt program, as shown in FIG. 12, in response to the fuel cut signal FUEL.

In step 12060, it is determined based on the fuel flag fCUT whether the internal combustion engine 1 is supplied with fuel or undergoing the fuel cut. In the fuel cut duration Tcut, the required torque Mm* of the generator-motor 8 in the motor mode is determined in step 12080, while in the fuel supply duration, the required torque Mm* of the generator-motor 8 in the generator mode is determined in step 12070. In step 12140, the required torque Mm* determined in step 12080 or 12070 is transmitted to the generator-motor drive unit 10 from the communication driver 1212 of the power source control unit 12. The generator-motor drive unit 10 activates the generator-motor 8 based on the required torque Mm*. This causes the vehicle speed V to be increased. During the increase in vehicle speed V, the transmission control unit 21 controls the continuously variable transmission 16 at the controlled gear ratio R* along a curve in FIG. 16 so that the engine speed Ne reaches Ne1. During a period of time from t10 to t4, the throttle valve open angle θ is maintained at θ0, and the internal combustion engine 1 is operated at speed Ne1 establishing the economical fuel consumption.

When the accelerator-manipulated variable ACC rises up to 100% at time t4, the full throttle mode is entered. The required output P* of the power source thus becomes greater than the output P0 of the internal combustion engine 1 which achieves the economical fuel consumption (i.e., the point B in FIG. 19). Therefore, the routine, as shown in FIG. 11, proceeds from step 1246 to step 1252 wherein the throttle valve open angle θ which is greater than θ0 is provided according to the equation (3). In step 1254, the fuel cut duration Tcut is set to zero (0) so that the fuel is supplied to the internal combustion engine 1 in normal combustion cycles. This causes the engine 1 to operate out of the economical fuel consumption so that an engine output rises, increasing the vehicle speed V. During a period of time until t12 at which the vehicle speed V reaches V1, the controlled gear ratio R* of the continuously variable transmission 16 is, as shown in FIG. 16, changed from Rmax to Rmin so that the engine speed Ne is maintained at Ne1. After time t12, the controlled gear ratio R* is fixed at Rmin, thereby causing the engine speed Ne to be increased from time t12 to time t5 at which the full throttle mode is completed.

When the accelerator-manipulated variable ACC is decreased from time 5, and the vehicle speed V is maintained constant, the high speed cruise mode is entered. In the high speed cruise mode, the internal combustion engine 1 operates at a fuel consumption rate, as shown in FIG. 19, shifted from the economical fuel consumption (i.e., the point B) to an uneconomical fuel consumption since the controlled gear ratio R* is maintained at Rmin. The vehicle travels at a constant speed with an engine torque only overcoming the running resistance. The required torque M* of the power source thus drops at time t5, thereby resuming the above discussed fuel cut control.

When the accelerator-manipulated variable ACC is decreased to zero at time t6, the engine brake mode is entered. Upon entering the engine brake mode, the routine of the main program of the power source control unit 12, as shown in FIG. 11, proceeds from step 1210 to step 1212 wherein it is determined that the brake-manipulate variable BRK shows the OFF-level. The routine then proceeds through step 1214 to step 1216 wherein the internal combustion engine 1 is deactivated. The routine proceeds to step 1218 wherein the operation mode flag fMODE is set to zero (0).

The routine then proceeds to step 1240 wherein the required torque M* of the power source is determined by look-up using the map as shown in FIG. 13. Specifically, the required torque M* is determined based on the vehicle speed V along a curve selected by a condition where ACC=0% and BRK=OFF. Since the operation mode flag fMODE is set to zero (0), the fuel cut duration Tcut is determined in step 1258 so as to agree with the fuel supply control cycle Tope, thereby stopping the fuel supply.

In the interrupt program as shown in FIG. 12 executed every input of the fuel injection signal INJ provided from the fuel control unit 11, the routine proceeds from step 12000 to step 12130 through step 12120. In step 12130, the required torque Mm* of the generator-motor 8 is determined according to the equation (5) that is the difference between the required torque M* of the power source and the negative engine output torque Mecut. The required torque Mm* of the generator-motor 8 is then outputted in step 12140 to the generator-motor drive unit 10 to control the generator-motor 8. Specifically, the generator-motor 8 is required in the engine brake mode from time t6 to time t7 to output the required torque Mm*.

The fuel control unit 11 receives the valve-off signal ENA outputted in the fuel cut duration Tcut from the power source control unit 12 to close all the fuel injection solenoid valves 3 for prohibiting the fuel supply. This causes the vehicle speed V to be decreased from time t6. The transmission control unit 21 provides in step 2108 the controlled gear ratio R* of Rmin until the vehicle speed V reaches V1 at time t13, thereby decreasing the engine speed Ne until time t13. During a period of time from t13 to t7, the controlled gear ratio R* of the continuously variable transmission 16 is changed to Rmax according to the map shown in FIG. 16, so that the engine speed Ne is maintained at Ne1.

When the brake pedal is depressed in the engine brake mode and the brake-manipulated variable BRK shows the ON-level at time t7, the brake-activated mode is entered. The system operation in the brake-activated mode is different from that in the engine brake mode only in that the routine of the program shown in FIG. 11 proceeds directly from step 1212 to step 1216, and the required torque M* of the power source determined in step 1240 shows a negative value. Other system operations are identical, and explanation thereof in detail will be omitted here.

In the brake-activated mode, the engine speed Ne is maintained at Ne1 until the vehicle speed V is decreased to V0. When the vehicle speed V is further decreased from time t14, the engine speed Ne drops and then reaches zero (0) at time 8. The vehicle speed V thus becomes zero (0), and the idle mode is entered.

When the ignition switch IG is turned off at time t9 during the idle mode, the programs of the generator-motor drive unit 10, the fuel control unit 11, the power source control unit 12, and the transmission control unit 21 terminate to deactivate the system.

In the above embodiment, the speed sensor 17 which measures the speed of the input pulley of the continuously variable transmission 16 used in determining the speed of the power source, may be omitted by using the engine speed sensor 1101.

The generator-motor 8 may include an induction motor. In this case, the rotor angular position detector installed in the generator-motor 8 may be omitted by using an output of the engine speed sensor 1101.

Figure 20:
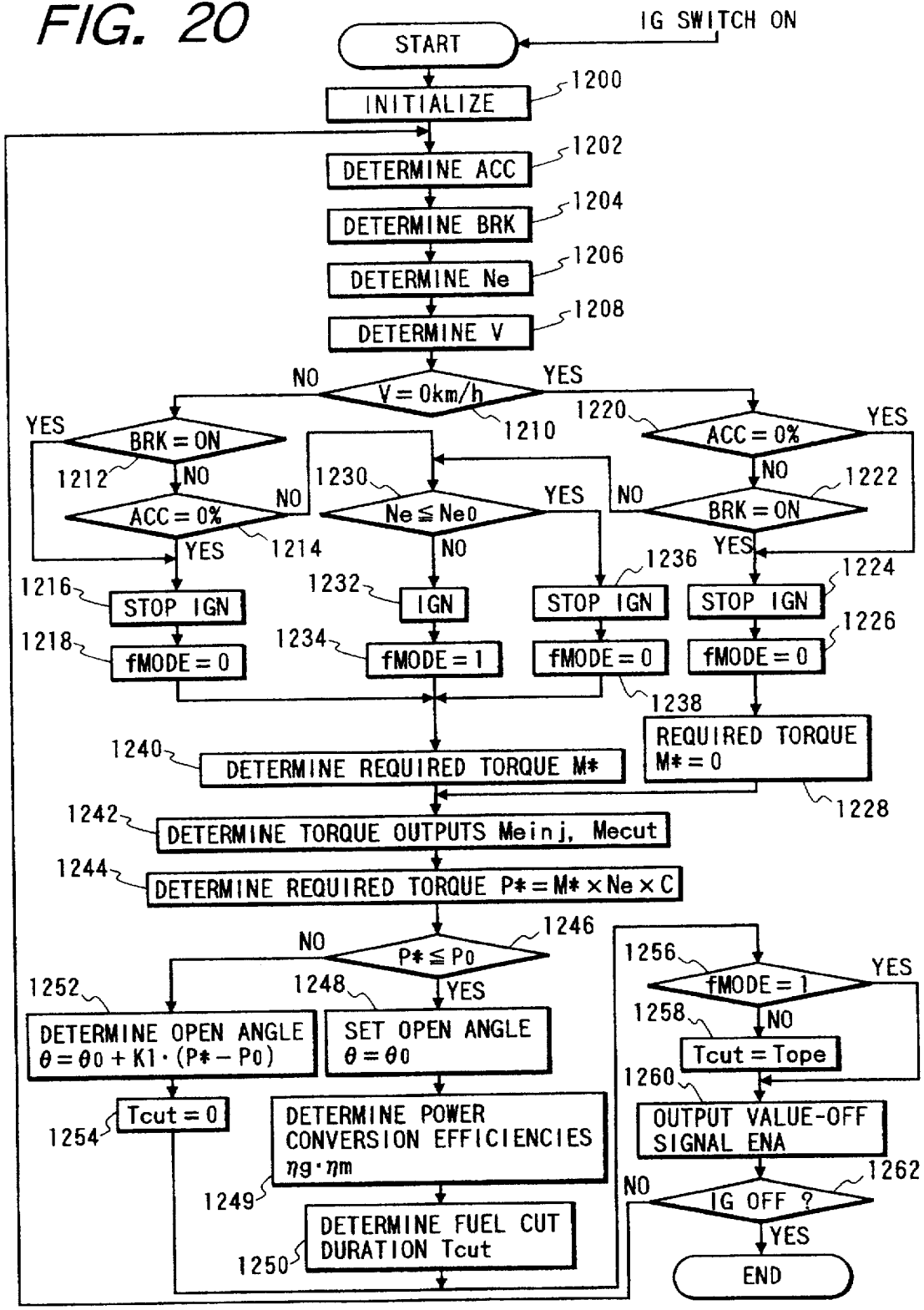
FIG. 20 is a flowchart of a program performed by a power source control unit according to the second embodiment.
Figure 21:
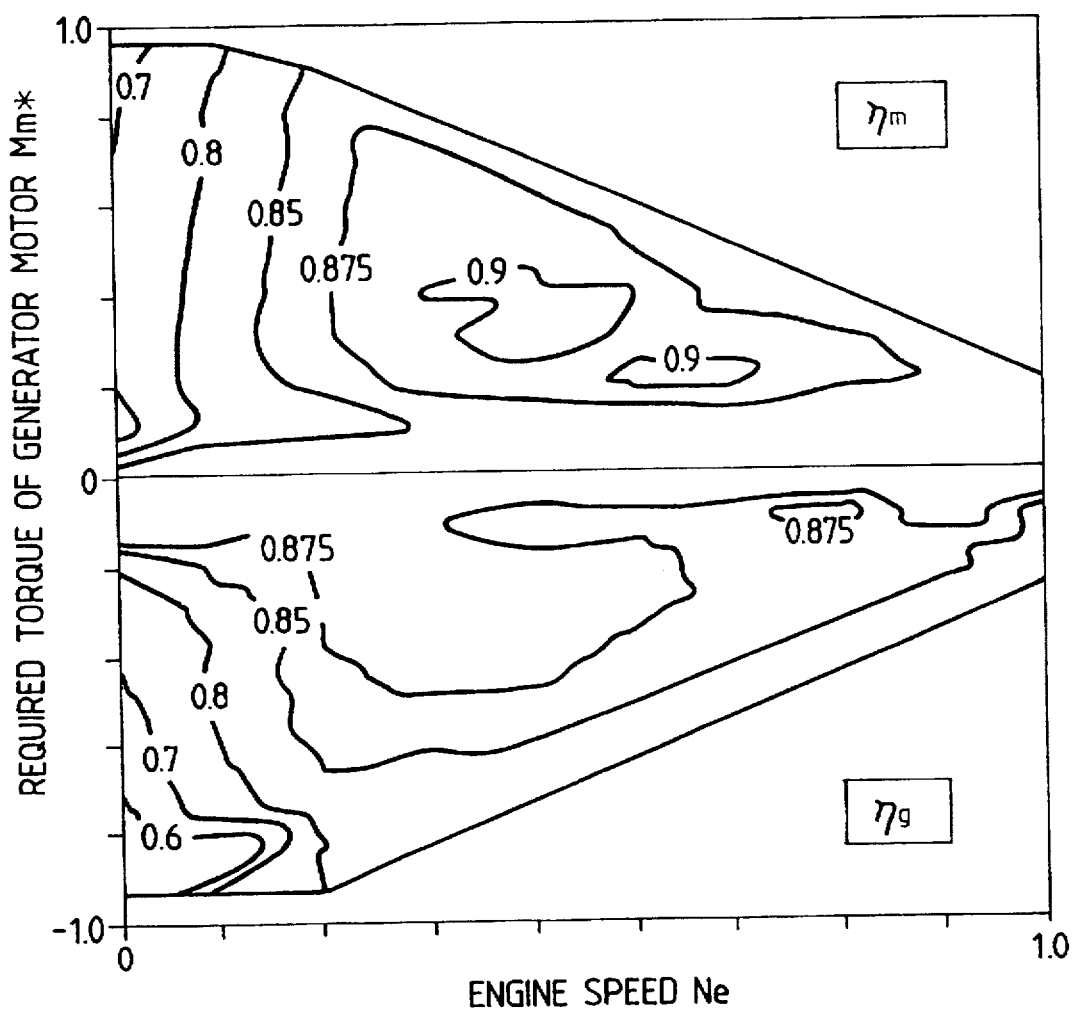
FIG. 21 is a graph which shows an operational coefficient of a generator-motor in terms of a required torque of a generator-motor and an engine speed.

FIG. 20 shows a flowchart of a program performed by the power source control unit 12 according to the second embodiment of the invention which is different from the one shown in FIG. 11 only in that step 1249 is added after step 1248 and in an operation of step 1250. Other steps are the same, and explanation thereof in detail will be omitted here.

The generator-motor 8 is, as described above, activated cyclically in the generator mode during the fuel supply duration and in the motor mode during the fuel cut duration. In the generator mode, the generator-motor 8 charges the battery unit 13, while in the motor mode, it consumes electrical energy stored in the battery unit 13. Usually, a generator-motor and an inverter operating the generator-motor produce loss of electrical energy. Thus, the power output Pbc of the generator-motor 8 in the fuel supply duration and the power Pem produced from the generator-motor 8, consumed by the internal combustion engine 1 in the fuel cut duration may be determined according to the equations (9) and (10) below using a power conversion efficiency ηg and a power conversion efficiency ηm. In the following equations, a charge/discharge efficiency of the battery unit 13 is ignored.

$$Pbc = Peg \times \eta g \quad (9)$$

$$Pem = Pbd \times \eta m \quad (10)$$

where Peg is the power produced through the generator-motor 8 by the internal combustion engine 1 in the generator mode. Pbd is the power discharged from the battery unit 13, and ηg and ηm are less than one (1).

Thus, if Peg=Pem, the following relation is satisfied.

$$Pbc = Pbd \times \eta g \times \eta m \quad (11)$$

From the equation (11), it is found that Pbd is greater than Pbc meaning that the electrical energy is consumed in the battery unit 13. Therefore, in step 1250 of FIG. 20, the fuel cut duration Tcut is determined according to the equation (12) below in order to prevent the battery unit 13 from being discharged fully.

$$Tcut = Tope \times (Meinj - M^*) \times \eta g \times \eta m / [M^* - Mecut - (Meinj - M^*) \times \eta g \times \eta m] \quad (12)$$

Figure 22:
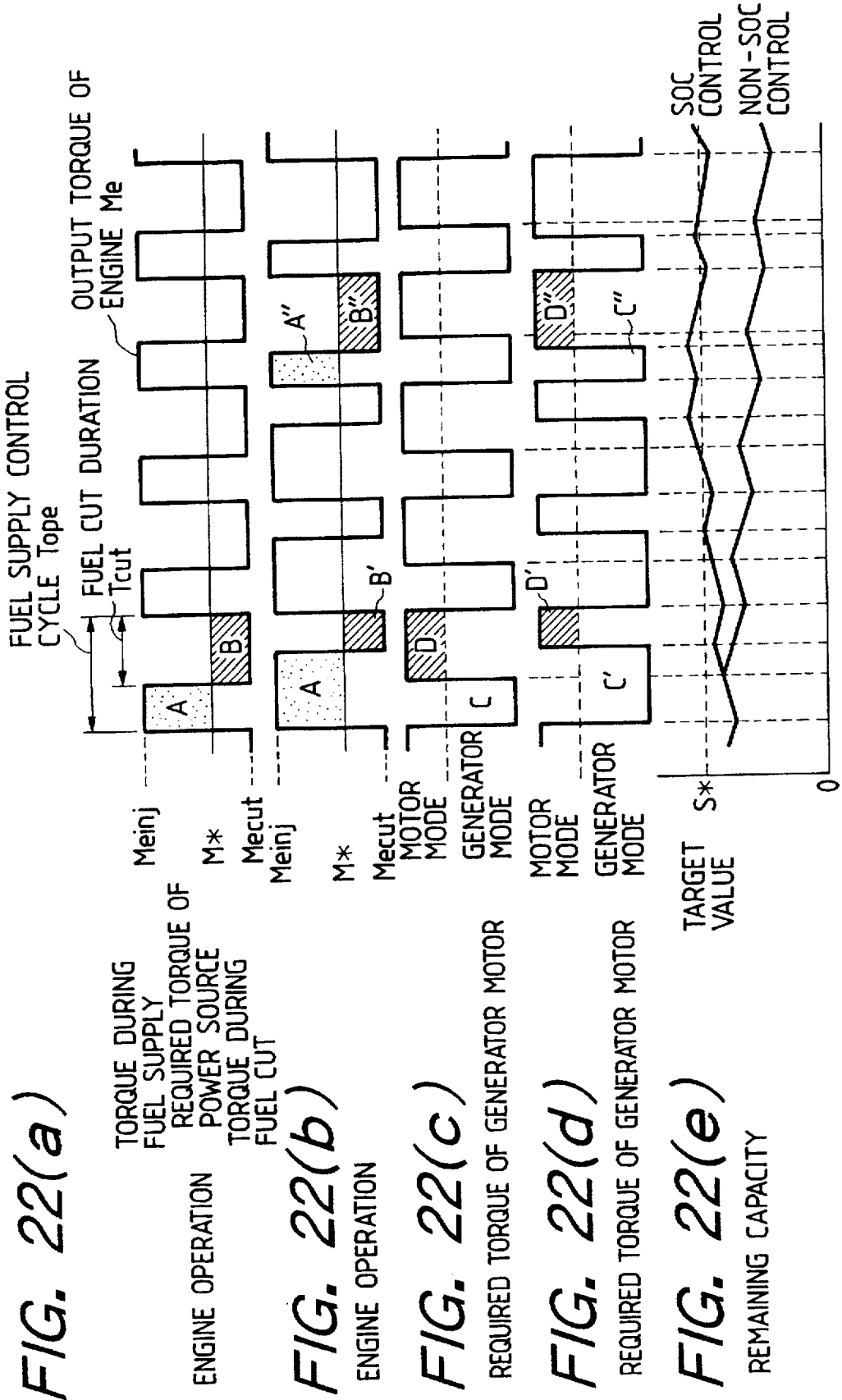
FIG. 22(a) is a time chart which shows an engine operation under non-SOC control.
FIG. 22(b) is a time chart which shows an engine operation under SOC control.
FIG. 22(c) is a time chart which shows a require torque of a generator-motor under non-SOC control.
FIG. 22(d) is a time chart which shows a require torque of a generator-motor under SOC control.
FIG. 22(e) is a time chart which shows a remaining capacity of a battery unit.

Note that ηg and ηm are determined in step 1249 by look-up using a two-dimensional map, as shown in FIG. 22, in terms of the engine speed Ne and the required torque Mm* of the generator-motor 8.

The third embodiment of the invention will be discussed below.

In the above second embodiment, if rounding errors occur at the operations in the fuel supply control, the remaining capacity of the battery unit 13 may be changed during traveling of the vehicle for an extended time, thereby causing the balance of charged energy and discharged energy of the battery unit 13 to be shifted to either of them. If the discharged energy is increased, it is necessary to use a large-capacity battery capable of storing a given amount of electrical energy at all times for ensuring the stability of the vehicle. Since the weight of a battery however usually affects the fuel consumption, the use of a light-weight battery achieves fuel economy. The third embodiment is thus designed to hold the remaining capacity of the battery unit 13 at a given level all the time in order to improve the fuel economy. This will be referred to as SOC control in the following discussion.

The determination of the required torque M* of the power source based on information about the remaining capacity of the battery unit 13 and vehicle traveling conditions will be discussed below with reference to FIGS. 22(a) to 22(e).

FIG. 22(a) shows a variation in output torque Me of the internal combustion engine 1 caused by interrupting the fuel supply for the fuel cut duration Tcut provided within the fuel supply control cycle Tope based on the required torque M* of the power source determined by the accelerator-manipulated variable ACC and the brake-manipulated variable BRK.

During the fuel supply as indicated by A, the internal combustion engine 1 provides an torque output in excess of the required torque M*, while during the fuel cut as indicated by B, the internal combustion engine 1 is lacking in torque output. Thus, the average of the output torque Me of the internal combustion engine 1 which is equal to the required torque M* of the power source may be established by bringing the power output of the generator-motor 8 during the fuel supply into agreement with the power consumed by the generator-motor 8 during the fuel cut. The internal combustion engine 1 however produces a pulse-shaped vibration in output torque Me as shown in FIG. 20(a), but it may be eliminated by controlling the generator-motor 8 based on the required torque Mm* as shown in FIG. 20(c). Specifically, during a period of time as indicated by C, the generator-motor 8 is actuated in the generator mode so that the power produced during the period of time C coincides with the power produced during the period of time A, while during a period of time as indicated by D, the generator-motor 8 is actuated in the motor mode so that the power consumed during the period of time D coincides with the power consumed during the period of time B. The power generated during the period of time C is charged in the battery unit 13, while the power consumed during the period of time D is discharged from the battery unit 13.

The above operation satisfies the equation (11) so that the remaining capacity SOC of the battery unit 13, as shown in FIG. 20(e), is decreased along a lower curve. The decrease in remaining capacity SOC is eliminated in this embodiment by the SOC control, as will be described below in detail, wherein the fuel cut duration Tcut is determined not only based on the required torque M* of the power source, but also based on a parameter indicating the remaining capacity of the battery unit 13.

For example, when the remaining capacity SOC of the battery unit 13 is below the target capacity S*, the fuel cut duration Tcut is, as indicated by B' in FIG. 22(b), set smaller than the period of time B in FIG. 22(a) so that the power produced in the fuel supply duration, as indicated by A', (i.e., the generator mode of the generator-motor 8) becomes greater than that in the period of time A. Conversely, when the remaining capacity SOC is above the target capacity S*, the fuel cut duration Tcut is, as indicated by B" in FIG. 22(b), set greater than the period of time B in FIG. 22(a) so that the power produced in the fuel supply duration, as indicated by A", becomes smaller than that in the period of time A. This maintains, as can be seen in FIG. 22(e), the remaining capacity SOC of the battery unit 13 near the target capacity S*.

The fuel cut duration Tcut in the SOC control is determined according to the equations (13) and (14) below.

$$Tcut = Tcut \times fSOC \quad (13)$$

$$fSOC = \alpha \times (S-S^*)/S^* \quad (14)$$

where fSOC is a remaining capacity correction coefficient, $\alpha$ is a proportional constant, the right term $(S-S^*)/S^*$ indicates the difference between the remaining capacity S and the target capacity S* which is normalized by the target capacity S*.

Specifically, in the equation (13), the fuel cut duration Tcut determined by the equation (2) or (12) is multiplied by the remaining capacity correction coefficient fSOC derived by the equation (14) to determine the corrected fuel cut duration Tcut.

Figure 23:
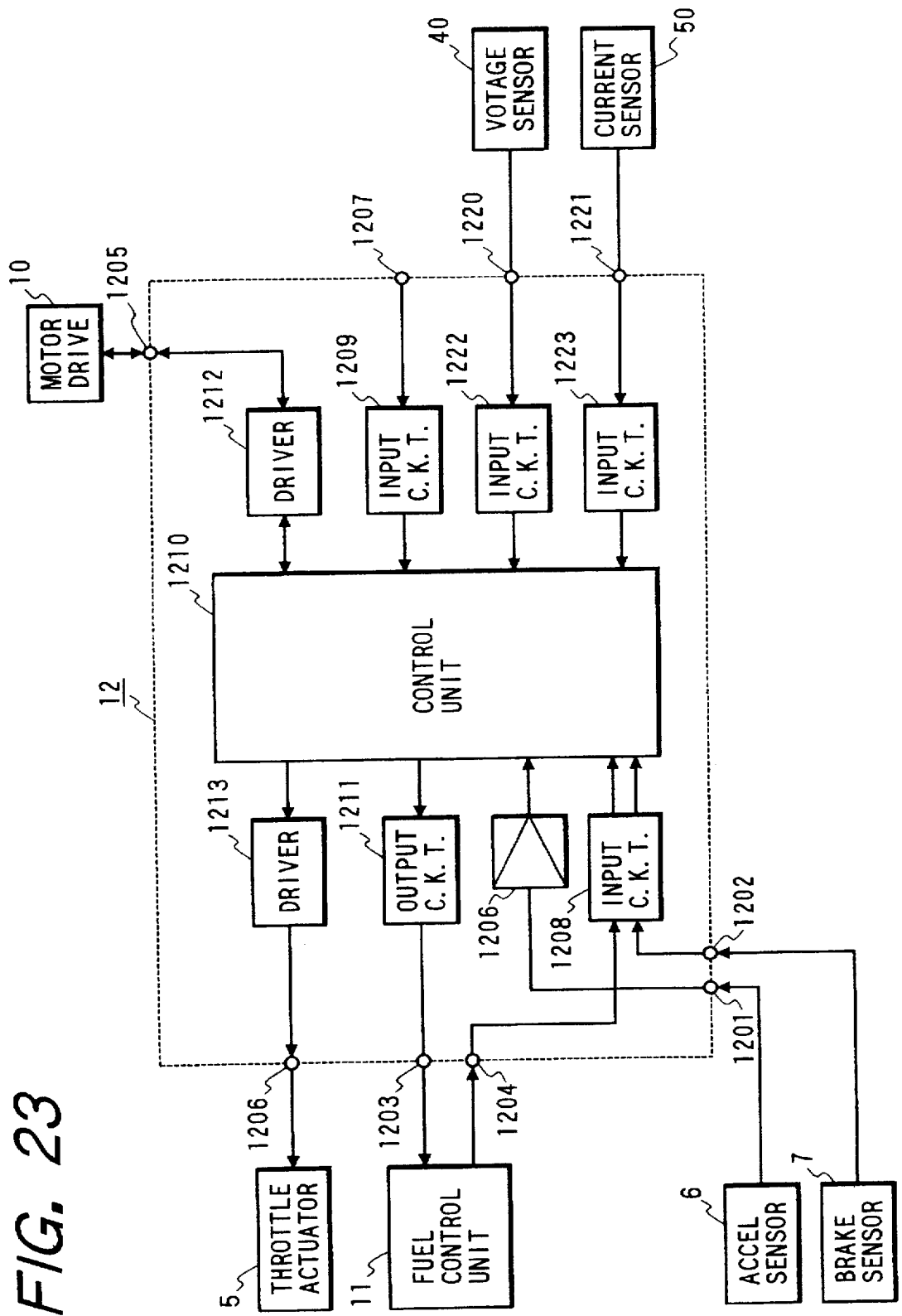
FIG. 23 is a block diagram which shows a circuit structure of a power source control unit of the third embodiment.

FIG. 23 shows a circuit structure of the power source control unit 12 of this embodiment.

The power source control unit 12 includes a voltage input circuit 1222 and a current input circuit 1223. The voltage input circuit 1222 is formed with an operational amplifier and connected through an input terminal 1220 to a voltage sensor 40 (e.g., a voltmeter) measuring voltage of the battery unit 13. The current input circuit 1223 is formed with an operational amplifier and connected through an input terminal 1221 to a current sensor 50 (e.g., an ammeter) measuring current flowing into and out of the battery unit 13. Other arrangements are the same as those of the power source control unit 12 shown in FIG. 10, and explanation thereof in detail will be omitted here.

Figure 24:
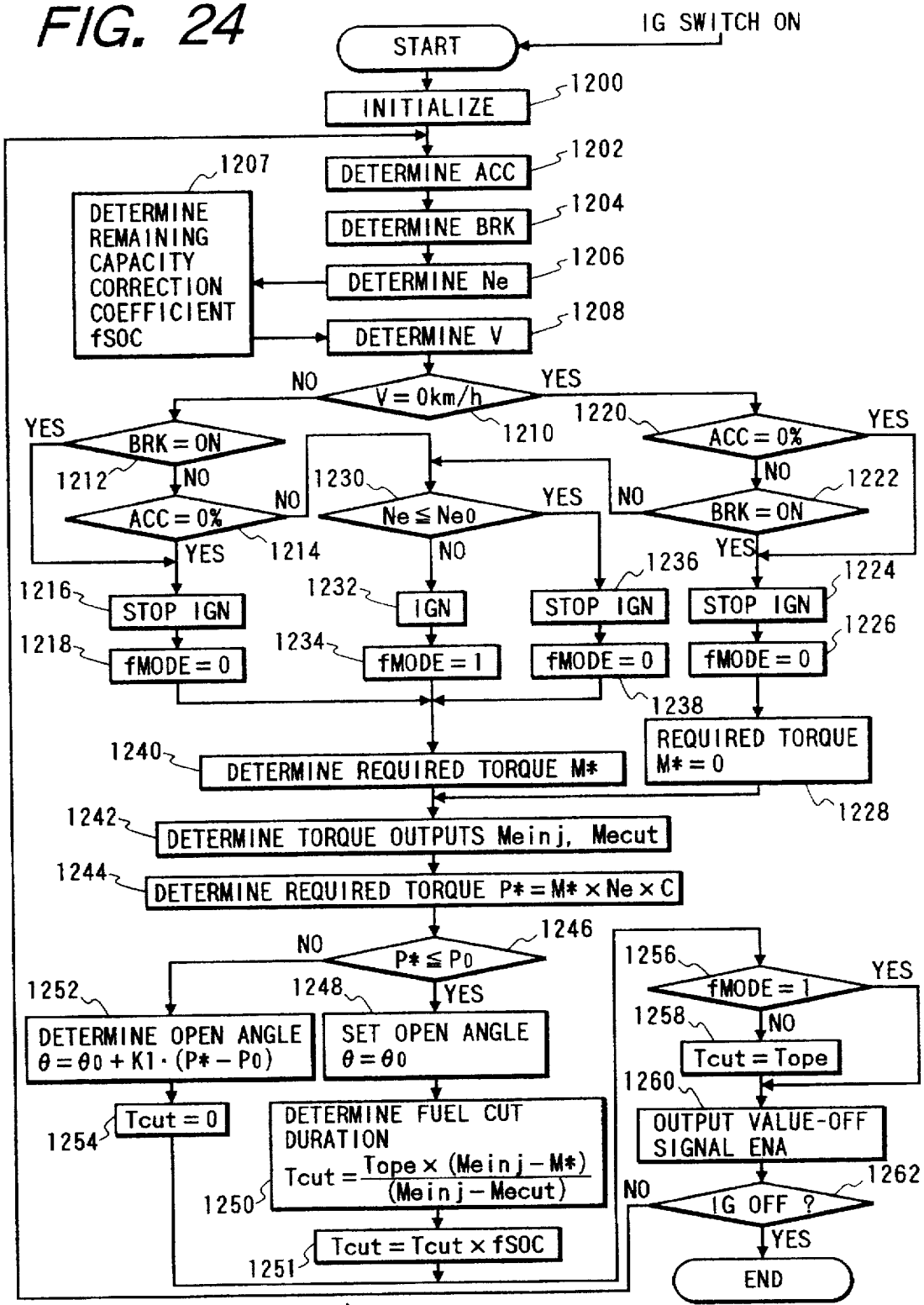
FIGS. 24 and 25 show a flowchart of a program performed by the power source control unit of FIG. 23.

FIG. 24 shows a flowchart of a program stored in an internal ROM of the control unit 1210 which is different from the one shown in FIG. 11 only in that step 1207 is provided between steps 1206 and 1208, and step 1251 is provided after step 1250. Other steps are identical.

Figure 25:
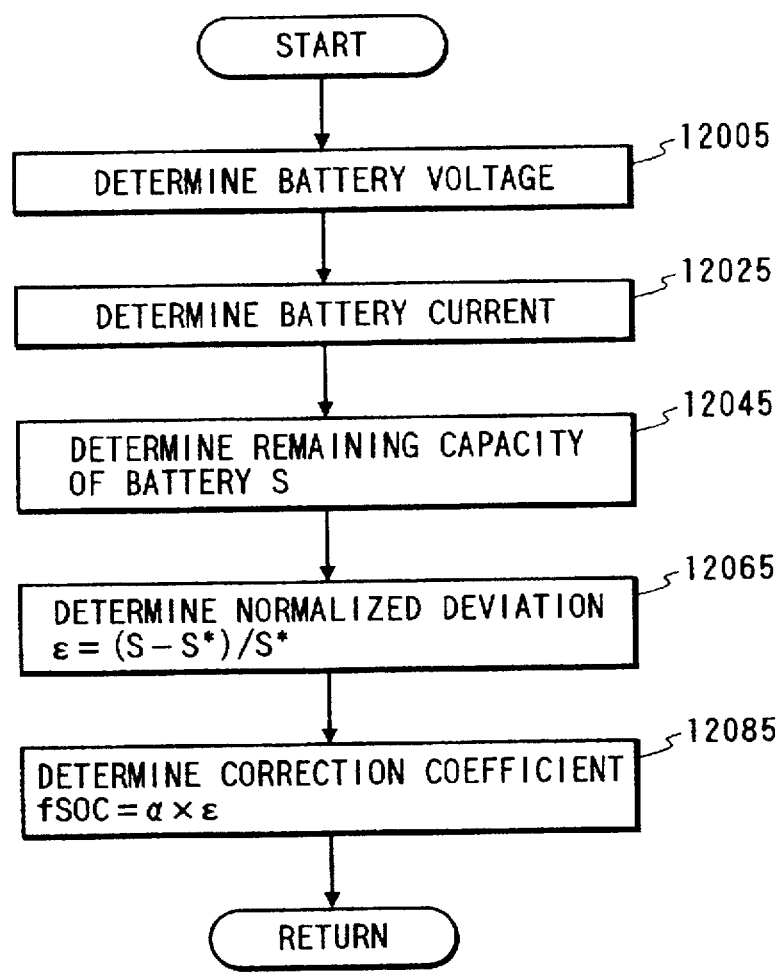

Step 1207 performs a subprogram shown in FIG. 25 for determining the remaining capacity correction coefficient fSOC used in the SOC control. Step 1251 corrects the fuel cut duration Tcut determined in step 1250 using the equation (13).

The subprogram in step 1207 will be discussed below.

First, in step 12005, the voltage of the battery unit 13 is monitored through the voltage sensor 40 and stored in a memory installed in the control unit 1210. In step 12025, the current of the battery unit 13 is monitored through the current sensor 50 and stored in the memory. In step 12045, the voltage and current are read out of the memory to determine the remaining capacity S of the battery unit 13 according to a known formula. For example, it may be determined based on accumulated input and output currents.

In step 12065, a normalized deviation $\epsilon$ is determined based on the target capacity S* stored in the ROM and the remaining capacity S determined in step 12045 according to the relation of $\epsilon = (S-S^*)/S^*$. In step 12085, the remaining capacity correction coefficient fSOC is determined using the normalized deviation $\epsilon$ according to the relation of $fSOC = \alpha \times \epsilon$. After completion of the operation in step 12085, the routine returns back to the main program in FIG. 24.

While in the third embodiment, the remaining capacity correction coefficient fSOC is determined based on the remaining capacity S of the battery unit 13, it may be determined using a parameter indicating a charged condition of the battery unit 13 such as a terminal voltage or internal impedance thereof.

Figure 26:
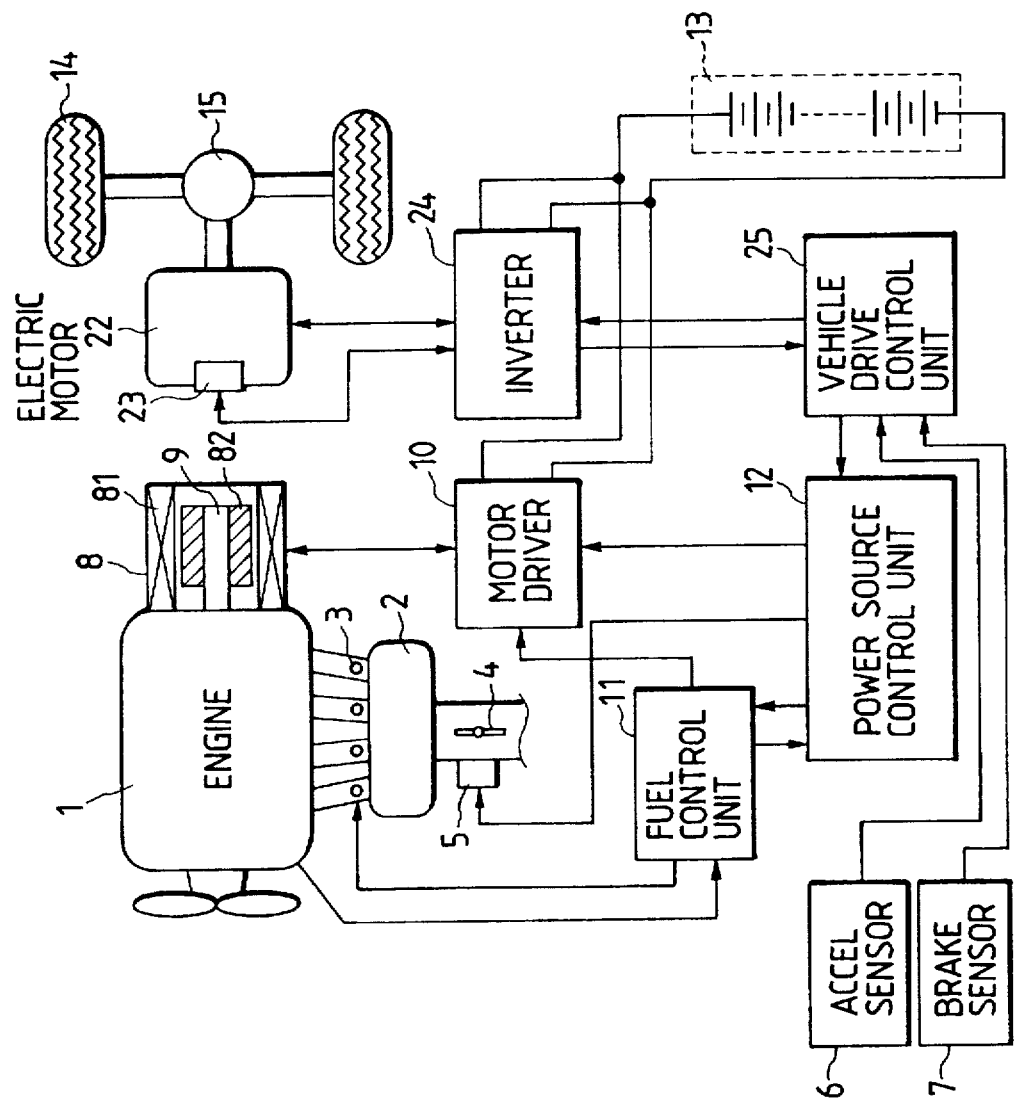
FIG. 26 is a block diagram which shows a series hybrid vehicle according to the fourth embodiment.

FIG. 26 shows a series hybrid vehicle according to the fourth embodiment of the invention.

The series hybrid vehicle of this embodiment includes a vehicle drive generator-motor 22, a speed detector 23, an inverter 24, and a vehicle drive control unit 25.

The internal combustion engine 1 and the generator-motor 8 do not provide torque directly to the driven wheels 14, but serve as a power source for the vehicle drive generator-motor 22.

The vehicle drive control unit 25, as will be described later in detail, determines a required traveling power Pt* of the vehicle. The power source control unit 12 determines the required torque M* of the power source (unit: Nm) based on the engine speed Ne and the required traveling power Pt* inputted from the vehicle drive control unit 25 to control fuel supply to the internal combustion engine 1 so that an output torque of the power source coincides with the required torque M*. The power source control unit 12 also determines the required torque Mm* of the generator-motor 8 to control the generator-motor 8 through the generator-motor drive unit 10.

The vehicle drive generator-motor 22 is formed with a permanent-magnet three-phase motor and has an output shaft connected to the differential gear 15. The speed detector 23 includes a resolver which measures the speed of the vehicle drive generator-motor 22 and provides a signal indicative thereof to the inverter 24. The inverter 24 controls the vehicle drive generator-motor 22 based on the required torque Mt* inputted from the vehicle drive control unit 25 and the speed of the vehicle drive generator-motor 22 measured by the speed detector 23. The vehicle drive control unit 25 determines the required torque Mt* based on the accelerator-manipulated variable ACC detected by the accelerator sensor 6, the brake-manipulated variable BRK detected by the brake sensor 7, and the speed of the generator-motor 8 detected by the speed detector 23 to control the inverter 24 and also determines the required traveling power Pt* based on the required torque Mt* and the speed of the vehicle drive generator-motor 22 to provide a signal indicative thereof to the power source control unit 12.

The inverter 24 has the same circuit structure as that of the generator-motor drive unit 10 shown in FIG. 3, but does not use the input terminal 1007. The power source control unit 12 has substantially the same circuit structure as shown in FIG. 10 except that a communication driver identical with the communication driver 1212 is provided instead of the pulse input circuit 1209, which is connected to a communication port of the control unit 1210, and the input terminal 1207 is connected to the vehicle drive control unit 25.

Figure 27:
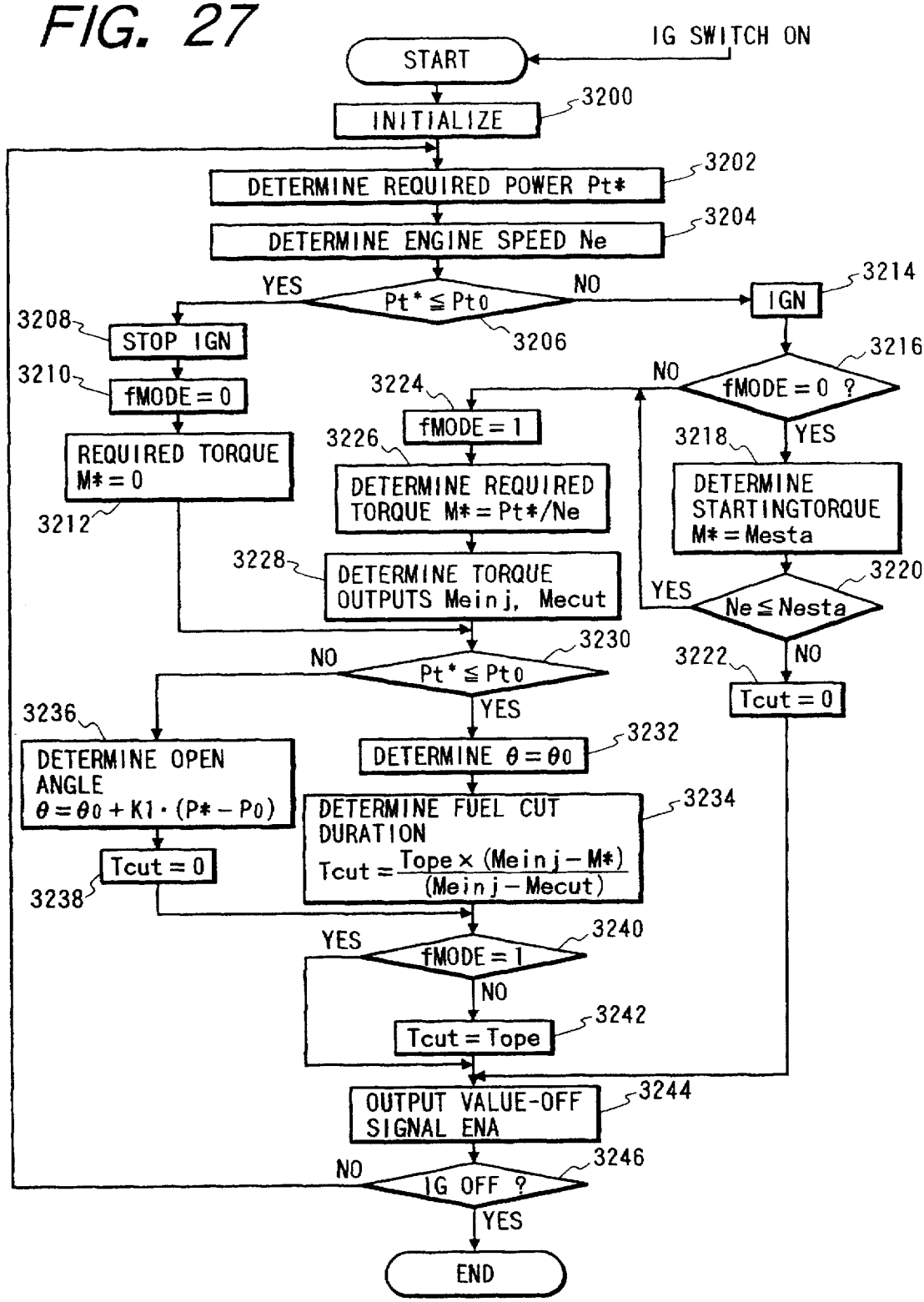
FIG. 27 is a flowchart of a program performed by a power source control unit of the fourth embodiment.

FIG. 27 shows a flowchart of a program performed by the control unit 1210 of the power source control unit 12.

Upon turning on the ignition switch IG, the program is entered. First, in step 3200, an input/output port in the control unit 1210 and the contents of variables memory locations and stack locations provided in an internal RAM are initialized. Specifically, the throttle valve open angle θ is set to the initial value $θ_0$.

The routine proceeds to step 3202 wherein required traveling power Pt* inputted from the vehicle drive control unit 25 through the communication driver 1209 is read out of the communication port and stored in the RAM.

The routine proceeds to step 3204 wherein the engine speed Ne is stored in the RAM. The routine then proceeds to step 3206 wherein it is determined whether an absolute value of the required traveling power Pt* is smaller than a given value Pt0 or not. This is because the energy consumption is improved by decreasing output of the power source to zero when electrical energy of the battery unit 13 is hardly consumed, for example, when the vehicle stops temporarily at an intersection. If a YES answer is obtained in step 3206, then the routine proceeds to step 3208. Alternatively, if a NO answer is obtained, then the routine proceeds to step 3214.

In step 3208, the ignition system of the internal combustion engine 1 is maintained deactivated. The routine proceeds to step 3210 wherein the operation mode flag fMODE indicating an operation mode of the power source is reset to zero (0). The routine proceeds to step 3212 wherein the required torque M* of the power source is set to zero (0), after which the routine proceeds to step 3230.

In step 3214, the ignition system of the internal combustion engine is actuated or maintained actuated if it was already actuated in a previous program cycle. The routine proceeds to step 3216 wherein it is determined whether the operation mode flag fMODE is zero (0) or not. If a NO answer is obtained (fMODE≠0) meaning that the internal combustion engine has already burned, then the routine proceeds to step 3224. Alternatively, if a YES answer is obtained, then the routine proceeds to step 3218 wherein the required torque M* of the power source is set to a starting torque Mesta of the internal combustion engine 1 which is stored in the ROM of the control unit 1210.

The routine proceeds to step 3220 wherein it is determined whether the engine speed Ne is greater than or equal to a given value Nesta or not which is stored in the ROM of the control unit 1210. This determination is made for determining whether the internal combustion engine 1 has been started or not. If a NO answer is obtained in step 3220, then the routine proceeds to step 3222 wherein the fuel cut duration Tcut is set to zero (0) to inhibit the internal combustion engine 1 from undergoing a fuel cut during a starting mode of engine operation. Alternatively, if a NO answer is obtained in step 3220, then the routine proceeds to step 3224 wherein the operation mode flag fMODE is set to one (1). The routine proceeds to step 3226 wherein the required torque M* of the power source is determined based on the required traveling power Pt* derived in step 3203 and the engine speed Ne derived in step 3204 according to the equation (15) below.

$$M^* = Pt^*/Ne \qquad (15)$$

The routine proceeds to step 3228 wherein the output torques Meinj and Mecut of the internal combustion engine 1 are determined by look-up using mapped data shown in FIG. 14 and stored in the RAM of the control unit 1210.

The following steps 3230 to 3246 are identical with steps 1246 to 1262 shown in FIG. 11, and explanation thereof in detail will be omitted here.

The program determining the required torque Mm* of the generator-motor 8 is also identical with the one shown in FIG. 12, and explanation thereof in detail will be omitted here.

Figure 28:
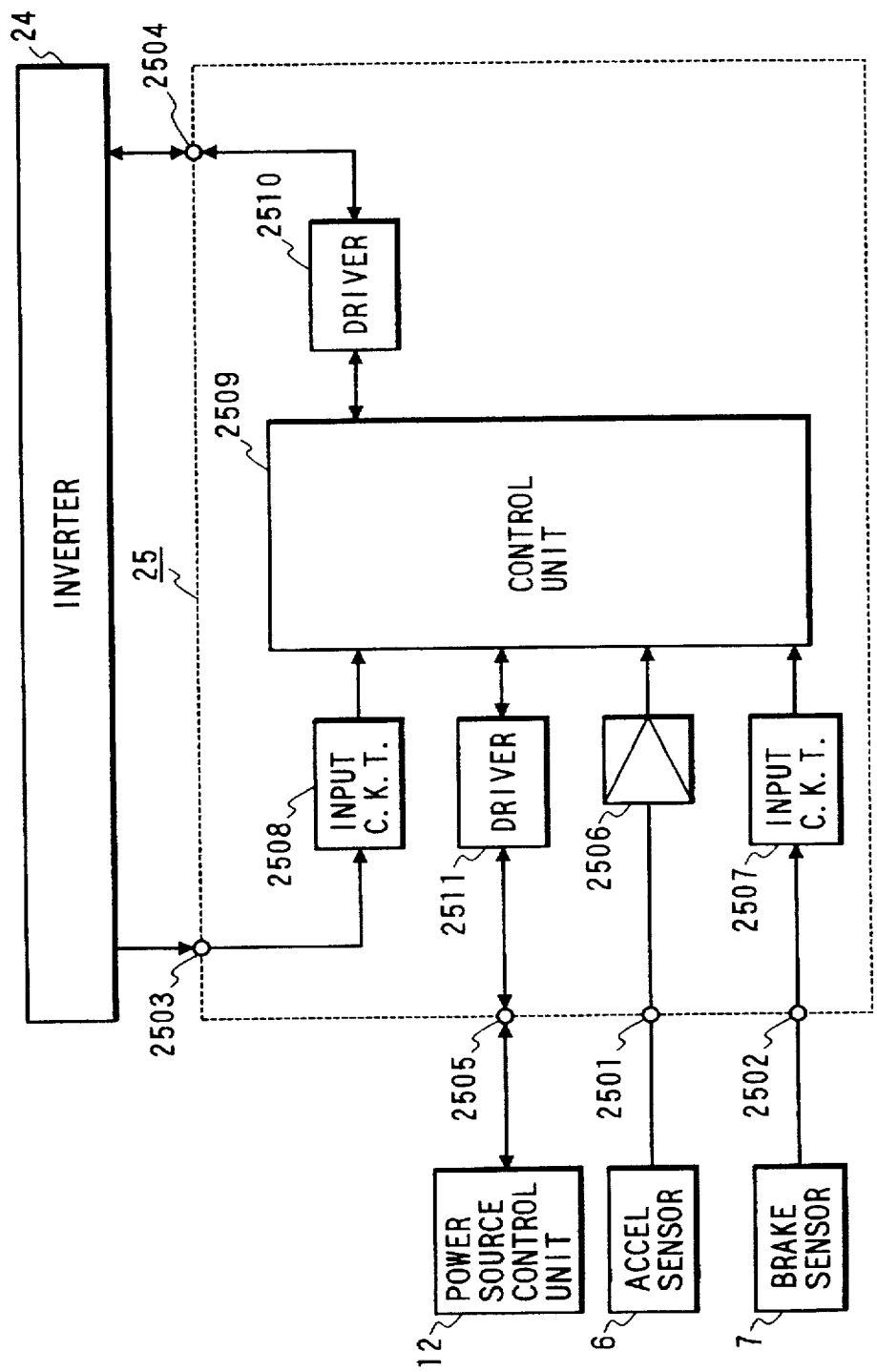
FIG. 28 is a block diagram which shows a circuit structure of a vehicle drive control unit.

FIG. 28 shows a circuit structure of the vehicle drive control unit 25.

The vehicle drive control unit 25 includes a pulse input circuit 2508, communication drivers 2511 and 2510, an analog input circuit 2506, a digital input circuit 2507, and a control unit 2509.

The analog input circuit 2506 includes a voltage amplifier and modifies in voltage a sensor signal inputted from the accelerator sensor 6 through an input terminal 2501 to provide it to the control unit 2509. The digital input circuit 2507 includes a buffer circuit consisting of transistors and converts in impedance a sensor signal inputted from the brake sensor 7 through an input terminal 2502 to provide it to the control unit 2509.

The pulse input circuit 2508 has the same circuit structure as that of the digital input circuit 2507 and converts in impedance a pulse signal indicative of the speed of the vehicle drive generator-motor 22, inputted from the inverter 24 through an input terminal 2503.

The control unit 2509 includes a microcomputer consisting of a single chip and determines the required torque Mt* of the vehicle drive generator-motor 22 and the required traveling torque Pt* based on the accelerator-manipulated variable ACC derived by the sensor signal from the accelerator sensor 6, the brake-manipulated variable BRK derived by the sensor signal from the brake sensor 7, and the speed of the vehicle drive generator-motor 22 inputted through the pulse input circuit 2508. The control unit 2509 then provides the required torque Mt* to the inverter 24 through the communication driver 2510 and the required traveling power Pt* to the power source control unit 12 through the communication driver 2511.

Figure 29:
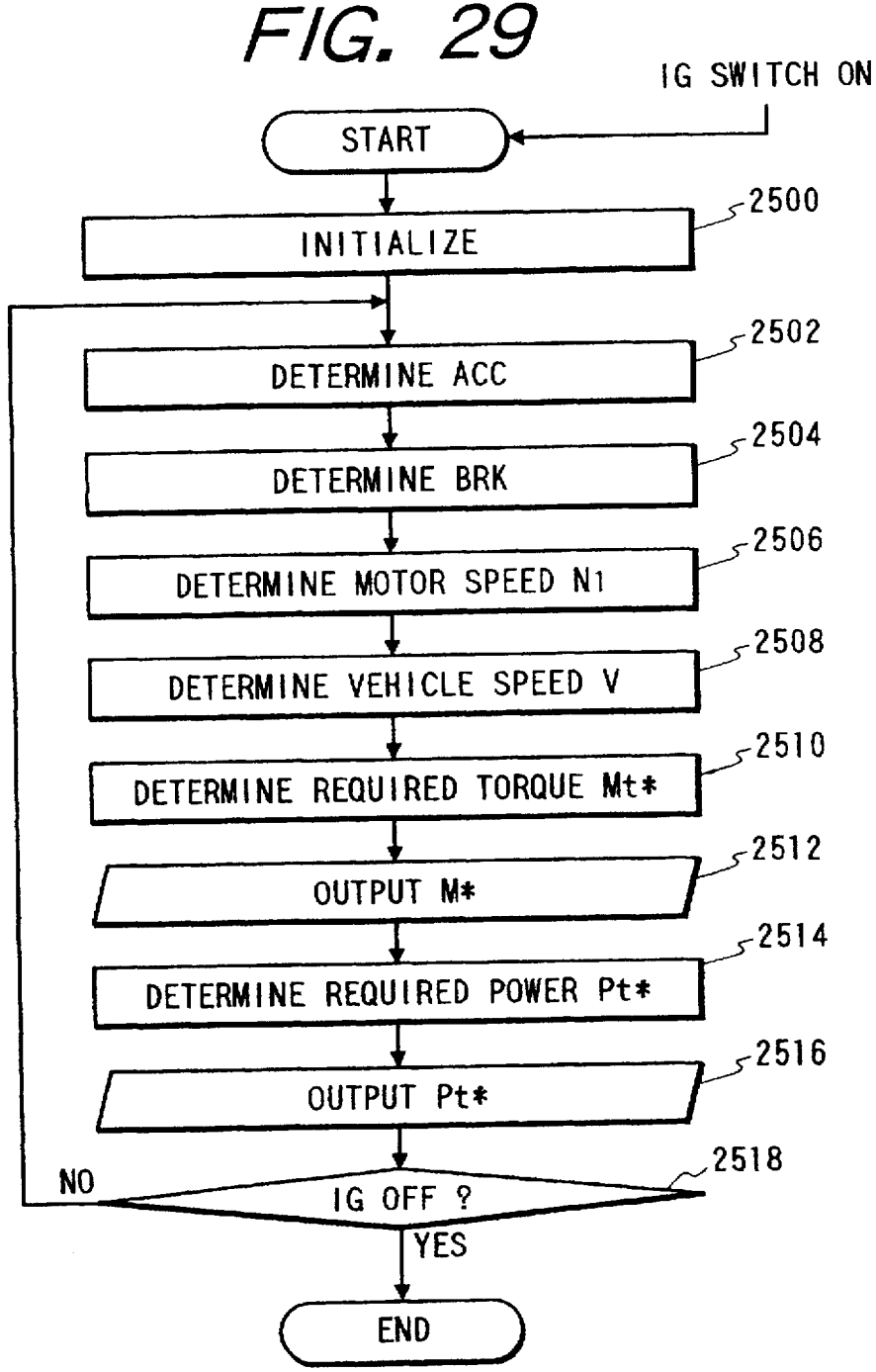
FIG. 29 show a flowchart of a program performed by the vehicle drive control unit of FIG. 28.

FIG. 29 shows a flowchart of a program performed by the control unit 2509 in response to turning on of the ignition switch IG.

After entering the program, the routine proceeds to step 2500 wherein variables stored in and a stack of a RAM and a general purpose resistor such as an input/output port of the control unit 2509 are initialized.

The routine proceeds to step 2502 wherein the accelerator-manipulated variable ACC is determined based on an output from the analog input circuit 2506 and stored in the RAM. The routine proceeds to step 2504 wherein the brake-manipulated variable BRK is determined based on an output from the digital input circuit 2507 and stored in the RAM. The routine proceeds to step 2506 wherein the speed Nt of the vehicle drive generator-motor 22 is determined based on an output from the pulse input circuit 2508 and stored in the RAM. The routine proceeds to step 2508 wherein the vehicle speed V is determined based on the speed Nt of the vehicle drive generator-motor 22 and stored in the RAM. The vehicle speed V is determined by multiplying the speed Nt by a proportional constant corresponding to a reduction ratio of the differential gear 15.

The routine proceeds to step 2510 wherein the required torque Mt* of the vehicle drive generator-motor 22 is determined by look-up using a map similar to the one shown in FIG. 13 based on the accelerator-manipulated variable ACC, the brake-manipulated variable BRK, and the vehicle speed V. The routine then proceeds to step 2512 wherein the required torque Mt* of the vehicle drive generator-motor 22 derived in step 2510 is inputted to a communication port installed in the control unit 2509. The routine proceeds to step 2514 wherein the required traveling power Pt* is determined based on the required torque Mt* of the vehicle drive generator-motor 22 derived in step 2510 and the speed Nt of the vehicle drive generator-motor 22 derived in step 2506 according to the equation (16) below and stored in the RAM.

$$Pt^* = Mt^* \times Nt \tag{16}$$

The routine proceeds to step 2516 wherein the required traveling power Pt* derived in step 2514 is inputted to the communication port installed in the control unit 2509. The routine proceeds to step 2518 wherein it is determined whether the ignition switch IG has been turned off or not. If a NO answer is obtained, then the routine returns back to step 2502. Alternatively, if a YES answer is obtained, then the routine terminates.

Figure 30:
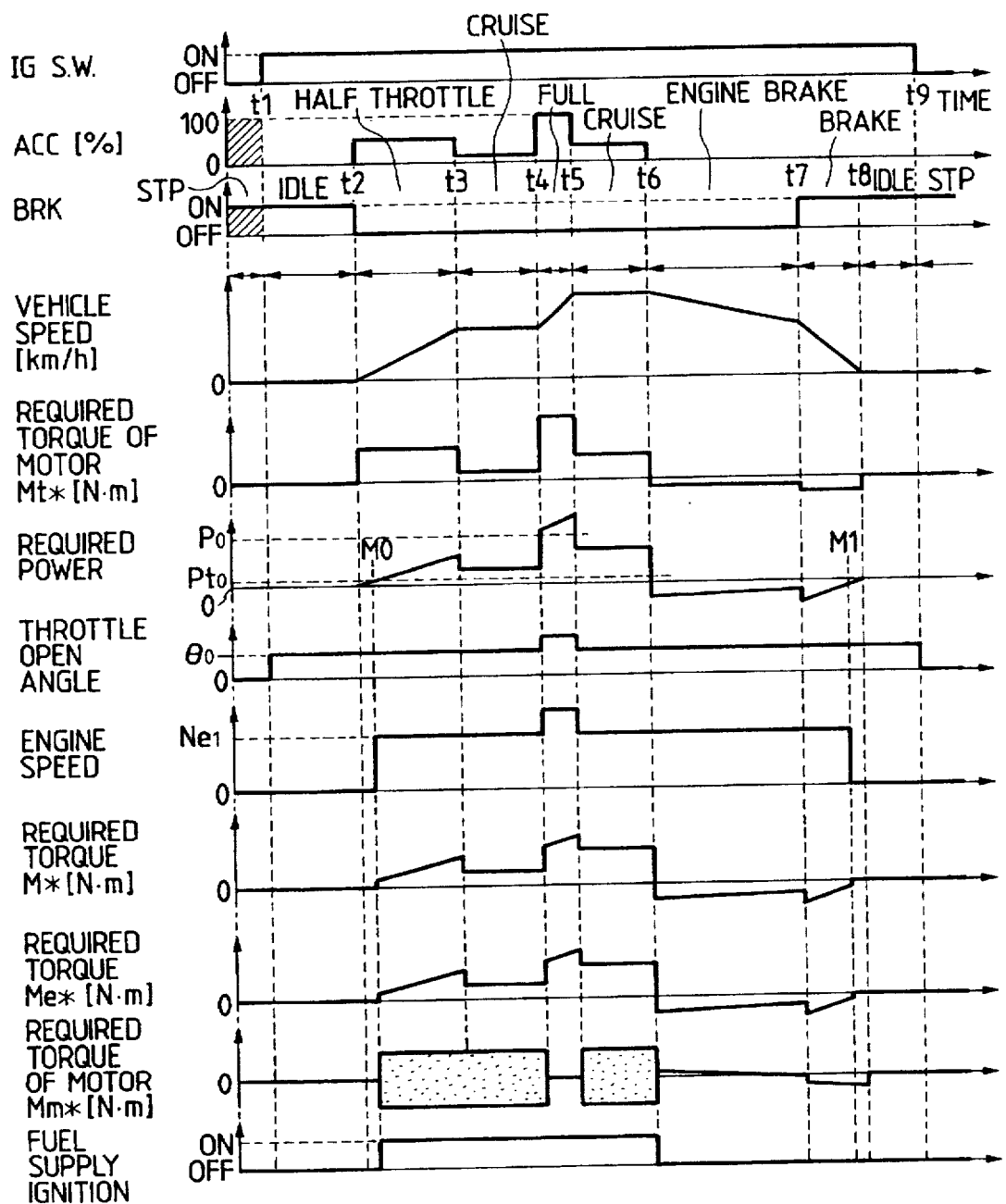
FIG. 30 is a time chart of system operations of the fourth embodiment.

FIG. 30 shows a sequence of system operations of this embodiment in the same vehicle operation modes as shown in FIG. 18.

When the ignition switch IG is turned on at time t1, the system is activated and enters the idle mode. In the idle mode, the generator-motor drive unit 10, the fuel control unit 11, the power source control unit 12, and the inverter 24, and vehicle drive control unit 25 are turned on to execute the programs as described above.

The generator-motor drive unit 10 performs the same operation as that in the first embodiment. Specifically, the generator-motor drive unit 10 inhibits the generator-motor 8 from outputting the torque.

The power control unit 11 also performs the same operation as that in the first embodiment to inhibit the fuel from being supplied to the internal combustion engine 1.

The power source control unit 12 performs the program as shown in FIG. 27. First, in step 3200, the required torque M* of the power source, the required traveling power Pt*, the engine speed Ne, and the fuel cut duration Tcut are reset to zeros, respectively, and the throttle valve open angle θ is reset to θ0.

In steps 3202 and 3204, the required traveling power Pt* and the engine speed Ne are determined. These parameters in the idle mode show zeros, respectively, so that in step 3206, an absolute value of the required traveling torque Pt* is determined to be smaller than Pt0. Therefore, the routine proceeds to steps 3208, 3210, and 3212. Specifically, the ignition of the internal combustion engine 1 is inhibited. The operation mode flag fMODE is set to zero (0). The required torque M* of the power source show zero (0).

After step 3212, the routine proceeds to step 3230 wherein the condition of Pt* ≤ Pt0 is encountered. Thus, in step 3232, the throttle valve open angle θ showing θ0 is provided for step 3234. In step 3234, the fuel cut duration Tcut is determined.

In step 3240, the operation control flag fMODE is determined to be zero. The routine proceeds to step 3242 wherein the fuel cut duration Tcut is set equal to Tope for inhibiting fuel supply to the internal combustion engine 1. Thus, the internal combustion engine 1 and the generator-motor 8 are both maintained deactivated.

The inverter 24 has, as described above, the same structure as that of the generator-motor drive unit 10 and inhibits the vehicle drive generator-motor 22 from outputting torque.

The vehicle drive control unit 25 performs the program shown in FIG. 29. In step 2502, the accelerator-manipulated variable ACC is determined to be zero. In step 2504, the brake-manipulated variable BRK is determined to be at the ON-level. In step 2506, the speed Nt of the vehicle drive generator-motor 22 is determined to be zero. In step 2508, the vehicle speed V is determined to be zero. Thus, the required torque Mt* of the vehicle drive generator-motor 22 is determined in step 2510 to be zero and then outputted in step 2512 to the inverter 24.

In step 2514, the required traveling power Pt* is determined according to the equation (16) as described above. Specifically, since Nt=0 and Mt*=0 in the idle mode, Pt*=0.

The required traveling power Pt* of zero is inputted to the vehicle drive control unit 25. The vehicle drive control unit 25 then maintains the internal combustion engine 1 and the generator-motor 8 deactivated to inhibit them from outputting torque.

When the brake-manipulated variable BRK shows the OFF level, and the accelerator-manipulated variable ACC rises at time t2, the moderate acceleration mode is entered.

Upon entering the moderate acceleration mode, the vehicle drive control unit 25 determines in step 2510 the required torque Mt* of the vehicle drive generator-motor 22. The required torque Mt* rises as shown in FIG. 30. The inverter 24 is responsive to the rising of the required torque Mt* to perform the same operation as that in step 1040 of FIG. 4 and provides the d-axis current signal imd* and the q-axis current signal imq*. These signals are converted into phase voltage signals (i.e., PWM signals) by timer interruption at intervals of 100 μm to control the vehicle drive generator-motor 22 so that it outputs torque Mt corresponding to the required torque Mt*. This causes the vehicle speed V to rise as shown in FIG. 30.

The vehicle drive control unit 25 is responsive to the rising of the vehicle speed V to determine in step 2514 of FIG. 29 the required traveling power Pt* according to the equation (16) and outputs it in step 2516 to the power source control unit 12. The power source control unit 12 determines in step 3206 of FIG. 27 that an absolute value of the required traveling power Pt* is greater than Pt0 and then activates in step 3214 the ignition switch of the internal combustion engine 1.

The fuel continues to be supplied to the internal combustion engine 1 until the engine speed Ne is determined in step 3220 as being greater than or equal to the given value Nesta.

When the engine speed Ne is increased with aid of rotation of the generator motor 8 and exceeds the given value Nesta, step 3224 sets the operation mode flag fMODE to one (1), and step 3226 determines the required torque M* of the power source according to the equation (15) as described above.

Next, in step 3228, the output torque Meinj in the fuel supply mode and the output torque Mecut in the fuel cut mode of engine operation are determined by look-up using the map shown in FIG. 14.

During the moderate acceleration mode from time t2 to time t3, the required traveling power Pt* is below the given value P0. Thus, in step 3230, the throttle valve open angle θ is maintained equal to the given value θ0. The fuel cut duration Tcut is determined in step 3234 according to the equation (2). The valve-off signal ENA is outputted in step 3244 based on the fuel cut duration Tcut derived in step 3234.

During execution of the program in FIG. 27, the interrupt program shown in FIG. 12 is executed every output of the fuel injection signal INJ. When the required torque M* of the power source rises at time t10, the operation mode flag fMODE is determined as showing one (1) in step 12000. The routine thus flows from step 12010 to 12140. In step 12070 or 12080, the required torque Mm* of the generator-motor 8 is determined according to the equation (4) or (5) and then outputted in step 12140 to the generator-motor drive unit 10.

The generator-motor 8 is responsive to input of the required torque Mm* to control the generator-motor 8 so that it outputs the required torque Mm* according to the programs as shown in FIGS. 4 and 5. Thus, the required torque Me* of the internal combustion engine 1 rises, as shown in FIG. 30, from time t10 and at the same time, the required torque Mm* of the generator-motor 8 rises to a given value. This causes the engine speed Ne to be increased with aid of output torque of the generator-motor. The internal combustion engine 1 and the generator-motor 8 so work until time t6 that the power source outputs torque according to the required traveling power Pt*.

The torque control of the internal combustion engine 1 and the generator-motor 8 is the same as discussed in the first embodiment, except that the fuel supply is controlled according to the required traveling power Pt*.

When the accelerator-manipulated variable ACC rises up to 100% at time 4, the full throttle mode is entered so that the required traveling power Pt* is increased above the given value P0 that is an output of the engine 1 when operating with the economical fuel consumption lying near the point B as shown in FIG. 19. This condition is found in step 3230 of FIG. 27 by the power source control unit 12. The throttle valve open angle θ which is greater than the given value θ0 is determined in step 3236 according to the equation (3). The fuel cut duration Tcut is set in step 3238 to zero (0) so that the internal combustion engine 1 is operated without undergoing a fuel cut. This causes the output torque of the internal combustion engine 1 to rise, resulting in an increase in fuel consumption above the point B shown in FIG. 19.

The power output of the generator-motor 8 is thus increased according to the required traveling torque Pt*.

When the acceleration-manipulated variable ACC is decreased, and the vehicle speed is maintained constant, the high speed cruise mode is entered from time 5 so that the required torque M* of the power source is decreased, as shown in FIG. 30, to a level corresponding to the running resistance. In the high speed cruise mode, the above described fuel supply control is performed.

When the accelerator-manipulated variable ACC is decreased to zero at time t6 in the high speed cruise mode, the engine brake mode is entered so that the required traveling torque Pt* changes to a negative torque less than the given value Pt0. Thus, the routine of the main program of the power source control unit 12, as shown in FIG. 27, proceeds from step 3206 to step 3208 wherein the ignition system of the internal combustion engine 1 is deactivated. In step 3210, the operation mode flag fMODE is set to zero (0).

The routine then proceeds to step 3212 wherein the required torque M* of the power source is set to zero (0). Since the operation mode flag fMODE is set to zero (0), the fuel cut duration Tcut is changed in step 3242 to agree with the fuel supply control cycle Tope, thereby prohibiting the fuel supply to the internal combustion engine 1 at time t6.

In the interrupt program as shown in FIG. 12 executed every input of the fuel injection signal INJ provided by the fuel control unit 11, the routine proceeds from step 12000 to step 12130 through step 12120. In step 12130, the required torque Mm* of the generator-motor 8 that is the difference between the required torque M* of the power source and the negative output torque Mecut of the engine 1 is determined according to the equation (5). The required torque Mm* of the generator motor is then outputted in step 12140 to the generator-motor drive unit 10 to control the generator-motor 8. The generator-motor 8 is thus required in the engine brake mode to output the required torque Mm*.

The fuel control unit 11 receives the valve-off signal ENA outputted within the fuel cut duration Tcut from the power source control unit 12 to close all the fuel injection solenoid valves 3 for stopping the fuel supply. This causes the vehicle speed V to be decreased from time t6.

When the brake pedal is depressed in the engine brake mode, and the brake-manipulated variable BRK shows the ON-level, the brake-activated mode is entered at time t7.

In the brake-activated mode, the engine speed Ne is maintained at Ne1 until an absolute value of the required traveling power Pt* reaches Pt0 and then decreased to zero at time t11. Specifically, the vehicle speed V drops to zero, and the idle mode is entered.

In the idle mode, when the ignition switch IG is turned off at time t9, it terminates the programs of the generator-motor drive unit 10, the fuel control unit 11, the power source control unit 12, and the transmission control unit 21 so that the system is deactivated.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the internal combustion engine 1 may be a diesel engine provided with a spill valve electrically controlled to inject fuel into the engine.

The internal combustion engine 1 is, as described above, an in-line four-cylinder gasoline engine having the fuel injection solenoid valves 3 disposed within the intake pipes. This type of engine is known to have the disadvantage that fuel stays within the intake pipes during steady combustion and then discharged directly from an exhaust pipe, thereby resulting in deterioration of emission control. The problem is eliminated by use of a cylinder injection engine. Thus, the internal combustion engine 1 may include a cylinder injection engine for improving the emission control.

What is claimed is:

1. A power source control apparatus for a hybrid vehicle driven by a power source including an internal combustion engine and a generator-motor comprising:

a generator-motor driver actuating the generator-motor;

a battery unit supplying electric energy to the generator-motor through said generator-motor driver;

a required power source torque determining circuit determining a required torque of the power source based on a parameter indicating an operational mode of the vehicle;

a fuel supply controller interrupting fuel supply to the internal combustion engine in a cycle based on the required torque of the power source determined by said required power source torque determining circuit;

an engine output torque determining circuit determining an output torque of the internal combustion engine; and a required generator-motor torque determining circuit determining a required torque of the generator-motor based on the required torque of the power source determined by said required power source torque determining circuit and the output torque of the internal combustion engine determined by said engine output torque determining circuit, said required generator-motor torque determining circuit providing a signal indicative of the required torque of the generator-motor to said generator-motor driver to actuate the generator-motor so as to output the required torque of the generator-motor.

2. A power source control apparatus as set forth in claim 1, wherein said fuel supply controller determines a fuel cut duration in which the internal combustion engine undergoes a fuel cut every given number of revolutions of the internal combustion engine and synchronizes the fuel cut duration with given timing associated with fuel injection timing.

3. A power source control apparatus as set forth in claim 2, further comprising a vehicle speed sensor measuring a speed of the vehicle, and wherein said fuel supply controller prohibits the fuel supply to the internal combustion engine all the time when the speed of the vehicle is less than a given value.

4. A power source control apparatus as set forth in claim 2, wherein the fuel cut duration is determined at least based on the required torque of the power source and an operational efficiency of the generator-motor driver.

5. A power source control apparatus as set forth in claim 2, wherein the fuel cut duration is determined at least based on the required torque of the power source and a state of charge of said battery unit.

6. A power source control apparatus as set forth in claim 5, further comprising a voltage detecting circuit detecting a terminal voltage of said battery unit and a current detecting circuit detecting a current flowing into and out of said battery unit, and wherein the state of charge of said battery unit is determined based on any one of a remaining capacity of said battery unit determined by the terminal voltage and the current detected by said voltage detecting circuit and the current detecting circuit, the terminal voltage of said battery unit, and an internal impedance of said battery unit determined by the terminal voltage and the current detected by said voltage detecting circuit and the current detecting circuit.

7. A power source control apparatus as set forth in claim 2, wherein said fuel supply controller synchronizes the fuel cut duration with given fuel injection timing.

8. A power source control apparatus as set forth in claim 1, wherein said required generator-motor torque determining circuit controls through said generator-motor driver said generator-motor so that a variation in the required torque of the generator-motor is synchronous with a combustion cycle of the internal combustion engine.

9. A power source control apparatus as set forth in claim 1, wherein said required generator-motor torque determining circuit controls through said generator-motor driver said generator-motor so that the generator-motor outputs torque in the fuel cut duration.

10. A power source control apparatus as set forth in claim 1, wherein said required generator-motor torque determining circuit controls through said generator-motor driver said generator-motor so that a time where the required torque of the generator-motor is changed is synchronous with any one of ignition timing of the internal combustion engine, a time when a pressure in a cylinder of the internal combustion engine reaches a given level, and a time when flames in the cylinder of the internal combustion engine are detected.

11. A power source control apparatus as set forth in claim 1, further comprising an intake air regulator regulating the amount of intake air of the internal combustion engine, said intake air regulator maintaining the amount of intake air per revolution of the internal combustion engine constant in a fuel cut duration in which the internal combustion engine undergoes a fuel cut, while it increases the amount of intake air per revolution of the internal combustion engine in a fuel supply duration in which fuel is supplied to the internal combustion engine.

12. A power source control apparatus as set forth in claim 1, further comprising a fuel injection mechanism which injects fuel directly into a cylinder of the internal combustion engine.

13. A hybrid vehicle having an accelerator pedal and a brake pedal comprising:
 a power source including an internal combustion engine and a generator-motor, providing an output torque;
 an accelerator sensor monitoring an operation of the accelerator pedal to determine an accelerator-manipulated variable;
 a brake sensor monitoring an operation of the brake pedal to determine a brake-manipulated variable;
 power source speed detector determining a speed of said power source;
 a continuously variable transmission including a torque input element into which the output torque of said power source is inputted and a torque output element outputting torque to wheels of the vehicle;
 a transmission speed sensor determining a speed of the torque output element of said continuously variable transmission;
 a transmission controller controlling a gear ratio of said continuously variable transmission based on the speed of the torque output element determined by said transmission speed sensor and the speed of said power source determined by said power source speed detector;
 a generator-motor driver actuating the generator-motor;
 a battery unit supplying electric energy to the generator-motor through said generator-motor driver;
 a required power source torque determining circuit determining a required torque of the power source based on the accelerator-manipulated variable and the brake-manipulated variable;
 a fuel supply controller prohibiting fuel supply to the internal combustion engine in a cycle based on the required torque of the power source determined by said required power source torque determining circuit;
 an engine output torque determining circuit determining an output torque of the internal combustion engine; and
 a required generator-motor torque determining circuit determining a required torque of the generator-motor based on the required torque of the power source determined by said required power source torque determining circuit and the output torque of the internal combustion engine determined by said engine output torque determining circuit, said required generator-motor torque determining circuit providing a signal indicative of the required torque of the generator-motor to said generator-motor driver to actuate the generator-motor so as to output the required torque of the generator-motor.

14. A hybrid vehicle having an accelerator pedal and a brake pedal comprising:
 a vehicle drive electric motor providing an output torque to wheels of the vehicle;
 an inverter actuating said vehicle drive electric motor;

a battery unit supplying electric energy to said vehicle drive electric motor through said inverter;

a power source including a generator-motor and an internal combustion engine, the internal combustion engine driving said generator-motor in a generator mode so as to produce electrical energy for charging said battery unit and driving said vehicle drive electric motor;

a motor speed sensor measuring a speed of said vehicle drive electric motor;

an accelerator sensor monitoring an operation of the accelerator pedal to determine an accelerator-manipulated variable;

a brake sensor monitoring an operation of the brake pedal to determine a brake-manipulated variable;

a generator-motor driver actuating the generator-motor in a motor mode;

a vehicle driver electric motor controller determining a required torque of said vehicle drive electric motor at least based on the accelerator-manipulated variable, the brake-manipulated variable, and the speed of said vehicle drive electric motor to determine a required power of the vehicle based on the required torque of said vehicle drive electric motor and the speed of said vehicle drive electric motor, said vehicle drive electric motor controller controlling said vehicle drive electric motor based on the required power of the vehicle through said inverter;

power source speed determining means for determining a speed of said power source;

a required power source torque determining circuit determining a required torque of said power source based on the required power of the vehicle determined by said vehicle drive motor controller and the speed of said power source determined by said power source speed determining means;

a fuel supply controller prohibiting fuel supply to the internal combustion engine in a cycle based on the required torque of the power source determined by said required power source torque determining circuit;

an engine output torque determining circuit determining an output torque of the internal combustion engine; and a required generator-motor torque determining circuit determining a required torque of the generator-motor based on the required torque of the power source determined by said required power source torque determining circuit and the output torque of the internal combustion engine determined by said engine output torque determining circuit, said required generator-motor torque determining circuit providing a signal indicative of the required torque of the generator-motor to said generator-motor driver to actuate the generator-motor so as to output the required torque of the generator-motor.

15. A hybrid vehicle as set forth in claim 14, further comprising power source deactivating means for deactivating said power source when an absolute value of the required power of the vehicle is less than a given value.

16. A hybrid vehicle as set forth in claim 15, further comprising power source activating means for starting said power source when the absolute value of the required power of the vehicle exceeds the given value.

17. A hybrid vehicle as set forth in claim 16, wherein said power source activating means controls a starting operation of said power source until the speed of said power source is greater than a given value so that said power source provides a given output.

18. A hybrid vehicle as set forth in claim 17, wherein said power source activating means supplies through said fuel supply controllers fuel to said internal combustion engine at all times until the speed of said power source is greater than the given value.

* * * * *